US011560630B2

(12) United States Patent
Miyaoka et al.

(10) Patent No.: US 11,560,630 B2
(45) Date of Patent: Jan. 24, 2023

(54) DETERGENT COMPOSITION AND AEROSOL COMPOSITION OF SAME

(71) Applicant: KOBEGOSEI CO., LTD., Ono (JP)

(72) Inventors: Masanobu Miyaoka, Ono (JP); Yuuji Miyaoka, Ono (JP)

(73) Assignee: KOBEGOSEI CO., LTD., Ono (JP)

( * ) Notice: Subject to any disclaimer, the term of this patent is extended or adjusted under 35 U.S.C. 154(b) by 235 days.

(21) Appl. No.: 17/142,393

(22) Filed: Jan. 6, 2021

(65) Prior Publication Data

US 2021/0123144 A1 Apr. 29, 2021

Related U.S. Application Data

(63) Continuation of application No. 16/469,370, filed as application No. PCT/JP2017/044997 on Dec. 14, 2017, now Pat. No. 10,889,902.

(30) Foreign Application Priority Data

Dec. 15, 2016 (JP) ............................ JP2016-243786

(51) Int. Cl.

| | |
|---|---|
| ***C11D 7/50*** | (2006.01) |
| ***C23G 5/028*** | (2006.01) |
| ***C09K 3/30*** | (2006.01) |
| ***C11D 7/30*** | (2006.01) |
| ***C23G 5/032*** | (2006.01) |

(52) U.S. Cl.

CPC ................ *C23G 5/028* (2013.01); *C09K 3/30* (2013.01); *C11D 7/30* (2013.01); *C11D 7/50* (2013.01); *C23G 5/032* (2013.01)

(58) Field of Classification Search

CPC .................................................. C11D 7/5018
USPC ........................................................ 510/488
See application file for complete search history.

(56) References Cited

U.S. PATENT DOCUMENTS

| | | | | |
|---|---|---|---|---|
| 2010/0004155 | A1 | 1/2010 | Ishihara et al. | |
| 2011/0041529 | A1 | 2/2011 | Chen et al. | |
| 2014/0070129 | A1 | 3/2014 | Kennoy et al. | |
| 2017/0014872 | A1* | 1/2017 | Herdlein | C11D 7/5018 |
| 2018/0265821 | A1 | 9/2018 | Imura et al. | |
| 2020/0123477 | A1 | 4/2020 | Miyaoka et al. | |

FOREIGN PATENT DOCUMENTS

| | | | |
|---|---|---|---|
| JP | 2008-133438 | A | 6/2008 |
| JP | 2010-248443 | A | 11/2010 |
| JP | 2011-520028 | A | 7/2011 |
| JP | 2014-523928 | A | 9/2014 |
| JP | 2017-43742 | A | 3/2017 |
| WO | 2008/053656 | A1 | 5/2008 |
| WO | 2017/057669 | A1 | 4/2017 |

OTHER PUBLICATIONS

International Search Report dated Jan. 23, 2018, issued in counterpart International Application No. PCT/JP2017/044997, with English Translation (5 pages).
Catalog, “1233Z” (Central Glass Co., Ltd., Oct. 2015), Cited in Specification (8 pages).
Nagase et al., “Properties and Applications of ASAHIKLIN AE-3000”, with Partial Translation, Cited in Specification (8 pages), 2004.

* cited by examiner

*Primary Examiner* — Gregory E Webb
(74) *Attorney, Agent, or Firm* — WHDA, LLP

(57) ABSTRACT

A method for washing a car/vehicle/transportation device and a method for washing a braking device of a car/vehicle/transportation device are disclosed. The methods include spraying a detergent composition for washing automobiles, two-wheeled vehicles, bicycles, construction equipment, farm equipment, aircraft, railroad cars, ships, and/or various other types of car/vehicle/transportation devices, thereby washing the car/vehicle/transportation device or the braking device, wherein the detergent composition includes (Z)-1-chloro-3,3,3-trifluoropropene and HFE-type nonflammable fluorinated-type solvent, mass % ratio thereof ((Z)-1-chloro-3,3,3-trifluoropropene/HFE-type nonflammable fluorinated-type solvent) being within a range that is 30/70 to 99/1.

2 Claims, No Drawings

DETERGENT COMPOSITION AND AEROSOL COMPOSITION OF SAME

CROSS-REFERENCE TO RELATED APPLICATIONS

This application is a continuation of U.S. application Ser. No. 16/469,370 filed on Jun. 13, 2019, which is a National Stage Application of International Application No. PCT/JP2017/044997 filed on Dec. 14, 2017, which claims priority to Japanese Application No. 2016-243786 filed on Dec. 16, 2015. The entirety of each of these related applications is hereby incorporated by reference.

TECHNICAL FIELD

This invention relates to a novel detergent composition and aerosol composition of same for use in washing workplaces, tools, work clothes, and gloves used by workers, and/or washing automobiles, two-wheeled vehicles, bicycles, construction equipment, farm equipment, aircraft, railroad cars, ships, and/or various other types of car/vehicle/transportation means, which is a detergent composition and aerosol composition of same for degreasing and washing work clothes and/or gloves of workers and/or car bodies, brake parts, suspensions, wheels, and/or various other types of car parts and/or control devices comprising metal(s) and/or combination of metal(s) and resin(s) in the context of various types of car/vehicle/transportation means, and which, being nonflammable, and the hazard of ignition and risk of fire thereof being low, and which, because they fall within the definition of nonhazardous materials under the Fire Prevention Law, do not require a hazardous material storage warehouse, and which are not subject to legal restrictions with respect to amounts that may be stored when the detergent composition is to be used in large quantities, and which moreover are of low toxicity, and which in addition have superior properties in that the environmental impact thereof in terms of depletion of the ozone layer and so forth is small, and which while moreover having washability, drying characteristics, and ability to prevent redeposition of dirt that are as good as or better than is the case with conventional detergent compositions, also possess superior properties in that the tendency thereof to attack rubber and/or resin is much lower than would be the case with conventional detergent compositions.

BACKGROUND ART

Automobiles, two-wheeled vehicles, bicycles, construction equipment, farm equipment, aircraft, railroad cars, ships, and various other types of car/vehicle/transportation means are such that car bodies, brakes, suspensions, wheels, and various other types of parts, devices, and the like are manufactured using metal(s) and/or any of various types of resin and/or the like. Furthermore, with the intention of reducing the weight and/or increasing the decorativeness thereof, members employing composite materials in which resins are combined with metals and so forth have in recent years also been used.

Such parts and devices employing metal are such that oily components, dirt, and the like adhere to surfaces thereof over the course of usage thereof, causing degradation to occur relative to expected properties and attractiveness. Furthermore, depending on what components adhere thereto, there may be corrosion of metal surfaces and irreversible loss of expected properties. Moreover, while grease and/or other such oily components are applied to necessary locations so as to smoothen the motion of respective devices in car/vehicle/transportation means, such oily components are subjected to flow of air, pelting by rainwater, and so forth during operation, as a result of which such oily components gradually flow to unintended locations and so forth; and furthermore, oily components and the like which flow thereto from other car/vehicle/transportation means are hurled up and so forth from the road surface together with dirt and adhere to respective portions of the car/vehicle/transportation means, which is a factor in the decrease which occurs relative to expected properties at the various parts and devices. In particular, in the context of frictional brake devices, often used in car/vehicle/transportation means, in which brake shoes outfitted with brake linings are made to act as braking elements with respect to brake discs, brake drums, and other such rotating bodies, because adherence of oily components thereto will cause reduction in the coefficient of friction, and because dust produced as a result of wear of brake linings will more easily tend to adhere thereto, which can cause reduction in the braking capability of the brakes, there has been a need to periodically carry out maintenance operations and wash metal members to which oily components and dirt have adhered.

Furthermore, during assembly and manufacture of various types of car/vehicle/transportation means, when applying resin, paint, or the like to metal and treating same, where small amounts of an oily component or the like continue to adhere to the metal surface, the resin or paint will not adhere thereto in stable fashion but will delaminate therefrom and deteriorate and so forth, causing dramatic reduction in product quality. Furthermore, at brakes, suspensions, wheels, and other such parts and devices that are particularly important for maintaining safety during operation, where small amounts of an oily component or the like continue to adhere thereto there will be decrease in the coefficient of friction, and where these are assembled while still in that state there will be loss of braking ability and so forth, making it impossible to provide expected properties in stable fashion. It is therefore desired during assembly and manufacture of various types of car/vehicle/transportation means that any small amounts of oily components adhering to metal surfaces of the respective parts be adequately washed off and removed therefrom in advance.

For this reason, as a detergent composition primarily for washing car bodies, brake parts, suspensions, wheels, and the like of various types of cars, vehicles, and transportation means, substances with good washability having trichloroethane as primary component have conventionally been developed and employed. However, the toxicity of trichloroethane is known. Furthermore, under the terms of the Montreal Protocol on Substances that Deplete the Ozone Layer which was issued under the Vienna Convention for the Protection of the Ozone Layer, production and consumption of trichloroethane in signing countries were to be gradually phased out, being completely eliminated by 1996, and imports and exports with countries nonsignatory to the Protocol were also to be prohibited or restricted. For this reason, use of detergent compositions employing trichloroethane has come to be avoided.

This being the case, with isohexane, cyclohexane, and other such C6 petroleum-type hydrocarbons as base, it has been proposed that ethanol, isopropyl alcohol, other such alcohols be added thereto to manufacture detergent compositions whose washability, drying characteristics, and boiling point have been adjusted, and that LPG gas be used to make these into aerosol compositions or that these be made into aerosol compositions that make use of compressed air and employ simple mobile-type aerosol dispensers, widespread use of which have been adopted.

However, as the petroleum-type hydrocarbons and alcohols employed in the aforementioned detergent composition are highly flammable, they are subject to restriction as hazardous materials under the Fire Prevention Law. For this reason, as it is required for their storage that a hazardous material storage warehouse be provided, they have incurred cost for the provision thereof. Furthermore, even if there is a hazardous material storage warehouse at the facility where detergent compositions are used, there are restrictions regarding the amounts that may be stored therein. In particular, while most of the aforementioned detergent compositions are classified as class 4, type 1 petroleums, because the designated quantity of class 4, type 1 petroleums established under applicable ordinance as being capable of being stored in a single warehouse is low, there has been the problem that only small amounts thereof may be stored notwithstanding that the amount of detergent compositions being used is large, improvement with respect to which has been desired.

Moreover, while the hydrocarbons used in the aforementioned detergent compositions do not have toxicity to the extent that trichloroethane does, because there is a danger that inhalation of excessive quantities could result in hydrocarbon poisoning, it is necessary that they be used in an environment which is either outdoors or which if indoors is equipped with ventilation equipment or is otherwise ventilated, product also containing written warnings to this effect. However, inasmuch as aerosol products are being used, hydrocarbons are present not only at the workplace but are also vaporized and travel downwind therefrom, and so a danger remains that they will be inhaled by persons there, improvement with respect to which has been desired.

Furthermore, when operations are being carried out, if the detergent composition is splashed out or the aerosol product is vigorously sprayed or the like, it is sometimes the case that the gloves and/or clothing of the worker will be soaked by a large amount of the aforementioned detergent composition, which is highly flammable. Furthermore, to remove oily dirt that has adhered to the work clothes or the gloves of the worker, these are sometimes soaked in a large amount of the aforementioned detergent composition. However, because the aforementioned detergent composition is highly flammable, where the drying that occurs thereafter is inadequate, there is a risk that an accident will occur due to combustion as a result of a spark from static electricity or a cigarette. This being the case, even where safety has been definitively ensured at the working environment, improvement has still been desired so that use of such highly flammable components might be avoided.

While halogen-type solvents are commonly well-known as solvents that do not have a flash point, there being restrictions with respect to manufacture and use of chlorine type substances and bromine-type substances due to the harmfulness thereof, use of these in detergent compositions is problematic. An aqueous product comprising carbitol, alcohol, or the like has therefore been proposed as a product or detergent component having a high flash point that employs a petroleum-type hydrocarbon having a large number of carbons as a way to solve the problem of storage amount and ensurance of safety (see Patent Reference No. 1).

However, the drying characteristics of the aforementioned aqueous composition are extremely poor and slow, as much time as 30 or 40 minutes being required for drying thereof and so forth (see Patent Reference No. 1). For this reason, if such an aqueous composition is used as a detergent composition, there will be a tendency following use thereof for liquid from the aqueous composition to remain in regions around the brakes, and if the brakes are used with the liquid still remaining in that state, this will lead to a situation in which this has a very serious effect; i.e., there will be a reduction in braking force. For this reason, work operations in which the aforementioned aqueous composition is used have been made complicated by the fact that it has been essential that adequate drying be carried out following washing, improvement with respect to which has been desired. Also, because it aqueous, the washability thereof is inferior to conventional detergent compositions which are used as brake cleaner, and because, depending on the type of dirt, the washing capability thereof is not necessarily adequate, there have been limits with respect to the sites at which it may be used, improvement with respect to which has been desired so as to increase the universality thereof.

It so happens that (Z)-1-chloro-3,3,3-trifluoropropene is known as a solvent which is capable of being used to wash metal materials. However, while (Z)-1-chloro-3,3,3-trifluoropropene has washability with respect to metal materials, it is known that it has high erosivity with respect to materials other than metal materials, i.e., resins and elastomers (see Nonpatent Reference No. 1). For this reason, with (Z)-1-chloro-3,3,3-trifluoropropene, it is necessary to perform adequate examination of the site where this is used.

In particular, with respect to the various braking devices, lights, windows, and other such important components for which it is desired that safety be maintained to a high degree in automobiles, two-wheeled vehicles, bicycles, construction equipment, farm equipment, aircraft, railroad cars, ships, and various other types of car/vehicle/transportation means, while metal materials are in general use therein, it is ordinarily the case that materials comprising polycarbonate, acrylic, ABS, polystyrene, silicone rubber, natural rubber, HNBR, NBR, fluorinated rubber, urethane rubber, and/or other such types of resins and elastomers are simultaneously used therein in addition to such metal materials. For example, brakes are controlled by the hydraulic pressure of brake fluid, rubber hoses that interconnect devices typically being filled with this brake fluid at the interior thereof.

However, when (Z)-1-chloro-3,3,3-trifluoropropene is allowed to come into contact with resins and elastomers, the high erosivity possessed by (Z)-1-chloro-3,3,3-trifluoropropene causes occurrence of such serious problematic situations as the deterioration of resins and elastomers at important components for which it is desired that safety be maintained to a high degree. In particular, because polycarbonate, which is in general use in important components of the aforementioned car/vehicle/transportation means, would suffer devitrification; because acrylic, ABS, and polystyrene would be dissolved thereby; and because silicone rubber, natural rubber, HNBR, NBR, fluorinated rubber, and urethane rubber would undergo swelling (see Nonpatent Reference No. 1), there is concern that there could be a decrease in safety.

Furthermore, where this is used as a composition for washing it will be necessary to use the composition for washing to adequately moisten locations that are to be washed before washing this off therefrom, but because (Z)-1-chloro-3,3,3-trifluoropropene dries extremely quickly due to its low boiling point, it is unsuited for operations in which it is to be used to moisten and then be washed off from some location. Where such moistening is carried out, there is concern that there could be a decrease in safety as a result of the fact that excessive amounts of (Z)-1-chloro-3,3,3-trifluoropropene may come in contact with resins and elastomers at important components.

Furthermore, as fluorinated-type solvents of the HFE (hydrofluoroether) type, there is 1,1,2,2-tetrafluoro-1-(2,2,2-trifluoroethoxy)ethane AE 3000/HFE-347pc-f), but because the molecule does not contain therewithin any chlorine such as might be highly effective in manifesting solubility with respect to various substances, it is known not to have high miscibility with respect to lipids (Nonpatent Reference No. 2). Furthermore, as a solvent in which a silicone compound used to lower the coefficient of friction of equipment is dissolved and which is for causing the surfaces of various items comprising metal, resin, and/or the like to be coated with such silicone compound, a substance in which 1,1,2,2-tetrafluoro-1-(2,2,2-trifluoroethoxy)ethane is blended in (Z)-1-chloro-3,3,3-trifluoropropene is known (see Patent Reference No. 2); however, great pains are in fact taken not to cause brake-related parts in automobiles, two-wheeled vehicles, construction equipment, farm equipment, aircraft, railroad cars, and various other types of cars to be coated with a silicone compound that would reduce the coefficient of friction and greatly reduce the braking force thereof.

Patent Reference No. 1: Japanese Patent Application Publication Kokai No. 2001-207199

Patent Reference No. 2: Japanese Patent No. 5648345

Nonpatent Reference No. 1: 1233Z, a Superior Environmental Performance and High Washing Power, Next-Generation Fluorinated-Type Solvent; Central Glass Co., Ltd.; catalog issued: October 2015

Nonpatent Reference No. 2: Properties and Applications of ASAHIKLIN AE-3000; Michiomi Nagase et al; Internet <http://www.agc.com/rd/library/2004/54-10.pdf>

SUMMARY OF INVENTION

Problem to be Solved by Invention

A problem to be solved by the present invention is to provide a novel detergent composition and an aerosol composition of same which, because they are nonflammable, possess little hazard of ignition and present little risk during fire, and which fall within the definition of nonhazardous materials under the Fire Prevention Law and do not require a hazardous material storage warehouse, and which are not subject to legal restrictions with respect to amounts that may be stored when the detergent composition is to be used in large quantities, and which moreover are of low toxicity, and which have properties such that the environmental impact thereof in terms of depletion of the ozone layer and so forth is small, and which while having washability and drying characteristics equivalent to those of conventional detergent compositions have much less tendency to attack rubber and/or resin than is the case with conventional detergent compositions.

Because detergent compositions are used in procedures in which dirt components are moistened and are washed off therefrom, the amounts thereof that are used and the amounts thereof that must be stored are large. For this reason, there is a need to greatly reduce the risk of fire due to ignition by selecting solvent(s) that have neither a combustible range nor a flash point under conditions of that temperatures that normally exist in the environments where these are used and the environments these are stored.

Furthermore, during washing, it is desired that dirt components be moistened with the detergent composition and be washed off therefrom. It is therefore necessary to not only provide the composition for washing in the form of a solution with which application and/or immersion may be carried out, but to also make this capable of being provided in the form of an aerosol composition that contains the detergent composition and gas propellant, which will not only simplify handling during washing but which will also facilitate physical removal of dirt as a result of utilization of gas pressure. Note that where this is provided in the form of an aerosol composition, because there will be increased risk of inhalation by workers, there will be a need to select solvent(s) of even lower toxicity for the detergent composition.

In addition, there is a need to achieve appropriate drying characteristics and to have a washability as good as or better than that of conventional products such as has not been attained by aqueous products or high-flash-point products.

Means for Solving Problem

To provide a novel detergent composition and an aerosol composition of same which might solve the foregoing problems, the present inventors engaged themselves in the task of ascertaining the properties possessed by various compounds and compositions, and investigating the washability thereof. Thereamong, it was discovered when a composition was produced by adding the HFE-type nonflammable fluorinated-type solvent 1,1,2,2-tetrafluoro-1-(2,2,2-trifluoroethoxy)ethane—which was known not to have high miscibility with respect to lipids due to the fact that the molecule does not contain therewithin any chlorine molecules such as might be highly effective in manifesting solubility with respect to various substances—to (Z)-1-chloro-3,3,3-trifluoropropene—which was known, due to the high erosivity thereof, to cause occurrence of deterioration, devitrification, dissolution, and other such serious abnormalities in resins and elastomers used at workplaces, tools, work clothes, gloves, and so forth used by workers, and at important components in automobiles, two-wheeled vehicles, bicycles, construction equipment, farm equipment, aircraft, railroad cars, ships, and/or various other types of car/vehicle/transportation means, and so forth, for which it is desired that safety be maintained to a high degree—that, surprisingly, the deterioration, devitrification, and dissolution with respect to resins and elastomers no longer occurred, and that moreover, properties as a composition for washing that were superior to those present conventionally were exhibited, which could be utilized as a novel composition for washing capable of being used to wash workplaces, tools, work clothes, and gloves used by workers, and/or automobiles, two-wheeled vehicles, bicycles, construction equipment, farm equipment, aircraft, railroad cars, ships, and/or various other types of car/vehicle/transportation means. Moreover, as other examples of HFE-type nonflammable fluorinated-type solvents—for which the molecule does not contain therewithin any chlorine such as might be highly effective in manifesting solubility with respect to various substances—it was also found that when $C_4F_9OCH_3$ or $C_3F_7OCH_3$ was combined with (Z)-1-chloro-3,3,3-trifluoropropene—which was known to cause occurrence of deterioration, devitrification, dissolution, and other such serious abnormalities in resins and elastomers—to produce compositions, that these similarly were such that the deterioration, devitrification, and dissolution with respect to resins and elastomers no longer occurred, and that moreover, properties as compositions for washing that were superior to those present conventionally were exhibited. In addition, by investigating in further detail the combination of the foregoing two components, the invention which is the novel composition for washing and aerosol composition of same was perfected.

A first means in accordance with the present invention for solving the foregoing problems is a detergent composition characterized in that it contains (Z)-1-chloro-3,3,3-trifluoropropene and HFE-type nonflammable fluorinated-type solvent.

A second means in accordance with the present invention for solving the foregoing problems is the detergent composition of the first means in accordance with the present invention characterized in that the HFE-type nonflammable fluorinated-type solvent is one or more species selected from among $C_4F_9OCH_3$, $C_3F_7OCH_3$, and 1,1,2,2-tetrafluoro-1-(2,2,2-trifluoroethoxy)ethane.

A third means in accordance with the present invention for solving the foregoing problems is the detergent composition of the first or second means in accordance with the present invention characterized in that mass % ratio ((Z)-1-chloro-3,3,3-trifluoropropene/HFE-type nonflammable fluorinated-type solvent) is within a range that is 50/50 to 99/1.

A fourth means in accordance with the present invention for solving the foregoing problems is the detergent composition of the third means in accordance with the present invention characterized in that it contains (Z)-1-chloro-3,3,3-trifluoropropene and $C_4F_9OCH_3$, mass % ratio thereof ((Z)-1-chloro-3,3,3-trifluoropropene/$C_4F_9OCH_3$) being 50/50 to 99/1, and preferably being 70/30 to 99/1.

A fifth means in accordance with the present invention for solving the foregoing problems is the detergent composition of the third means in accordance with the present invention characterized in that it contains (Z)-1-chloro-3,3,3-trifluoropropene and $C_3F_7OCH_3$, mass % ratio thereof ((Z)-1-chloro-3,3,3-trifluoropropene/$C_3F_7OCH_3$) being 80/20 to 99/1.

A sixth means in accordance with the present invention for solving the foregoing problems is the detergent composition of the third means in accordance with the present invention characterized in that it contains (Z)-1-chloro-3,3,3-trifluoropropene and 1,1,2,2-tetrafluoro-1-(2,2,2-trifluoroethoxy)ethane, mass % ratio thereof ((Z)-1-chloro-3,3,3-trifluoropropene/1,1,2,2-tetrafluoro-1-(2,2,2-trifluoroethoxy)ethane) being 50/50 to 99/1, and preferably being 70/30 to 99/1.

A seventh means in accordance with the present invention for solving the foregoing problems is the detergent composition according to any one of the first through the sixth means in accordance with the present invention characterized in that the detergent composition is capable of being used to wash workplaces, tools, work clothes, and/or gloves used by workers, and/or automobiles, two-wheeled vehicles, bicycles, construction equipment, farm equipment, aircraft, railroad cars, ships, and/or various other types of car/vehicle/transportation means.

An eighth means in accordance with the present invention for solving the foregoing problems is the detergent composition according to any one of the first through the seventh means in accordance with the present invention characterized in that the detergent composition is for use as a brake cleaner for automobiles, two-wheeled vehicles, bicycles, construction equipment, farm equipment, aircraft, railroad cars, ships, and/or various other types of car/vehicle/transportation means.

A ninth means in accordance with the present invention for solving the foregoing problems is an aerosol composition that contains gas propellant and the detergent composition according to any one of the first through the eighth means in accordance with the present invention.

Benefit of Invention

A detergent composition and an aerosol composition of same that are means in accordance with the present invention are made to contain (Z)-1-chloro-3,3,3-trifluoropropene and HFE-type nonflammable fluorinated-type solvent(s), each of which has no flash point and is nonflammable, these being blended therein as principal components thereof. This being the case, there is little risk during fire or hazard of ignition under conditions that exist in environments where such detergent composition and aerosol composition of same are used. In addition, because each of these principal components, i.e., (Z)-1-chloro-3,3,3-trifluoropropene and HFE-type nonflammable fluorinated-type solvent(s), falls within the definition of a nonhazardous material under the Fire Prevention Law, it does not require a hazardous material storage warehouse and is not subject to legal restrictions with respect to amounts that may be stored when the detergent composition is to be used in large quantities. Furthermore, because each of the foregoing components is of low toxicity and has little environmental impact in terms of depletion of the ozone layer and so forth, the product produced therefrom will be environmentally friendly and gentle in terms of effect on the human body. In addition, the detergent composition and aerosol composition of same in accordance with the means of the present invention, while being furnished with washability and drying characteristics that are not inferior to those of conventional brake cleaners, also exhibit superior characteristics in that they have much less tendency to attack rubber and resin than is the case with conventional brake cleaners.

Embodiments for Carrying out Invention

Best modes for carrying out the present invention are described below with reference to the tables in terms of detergent compositions and aerosol compositions of same that serve as means in accordance with the present invention.

Principal Components

Principal components of a detergent composition and an aerosol composition of same that are means in accordance with the present invention will now be described. A detergent composition and an aerosol composition of same that are means in accordance with the present invention are made to contain two components, these being (Z)-1-chloro-3,3,3-trifluoropropene and an HFE-type nonflammable fluorinated-type solvent.

Because the foregoing (Z)-1-chloro-3,3,3-trifluoropropene causes occurrence of deterioration, devitrification, dissolution, and so forth of resins and elastomers (Nonpatent Reference No. 1), when used as a component in a detergent that will be used with resins and elastomers it is preferred that it not be used as is. Furthermore, because HFE-type fluorinated-type solvents such as 1,1,2,2-tetrafluoro-1-(2,2,2-trifluoroethoxy)ethane do not have high miscibility with respect to lipids due to the fact that the molecule does not contain therewithin any chlorine molecules such as might be highly effective in manifesting solubility with respect to various substances (Nonpatent Reference No. 2), it is incapable of serving as a component for achieving washability.

However, if a substance is made to contain (Z)-1-chloro-3,3,3-trifluoropropene, which is unsuited as a component for blending in such a detergent composition, together with HFE-type nonflammable fluorinated-type solvent, which is incapable of serving as a component for achieving washability, it is found that, contrary to what might be expected, the composition that is produced no longer exhibits the deterioration, devitrification, dissolution, and other such effects on resins and elastomers, and yet is found to have washing properties that are broader and better than would be the case conventionally. By therefore causing a substance to contain both (Z)-1-chloro-3,3,3-trifluoropropene and HFE-type nonflammable fluorinated-type solvent as the major components thereof, it is possible to provide a novel detergent composition and aerosol composition of same that have superior properties and are capable of being used with a broader range of categories of materials while retaining various safety characteristics.

(Z)-1-chloro-3,3,3-trifluoropropene

The aforementioned detergent composition and aerosol composition of same that are means in accordance with the present invention are made to contain (Z)-1-chloro-3,3,3-trifluoropropene, this being one of the two essential components that are contained therein. As the (Z)-1-chloro-3,3,3-trifluoropropene, substances commercially available under the name of 1233Z (Central Glass Co., Ltd.; Japan) and the like as hydrofluoroolefinic solvents may be obtained and used.

(Z)-1-chloro-3,3,3-trifluoropropene is a nonflammable solvent having no flash point and also having no combustible range as defined at ASTM E681 explosive limit test methods. Furthermore, the chemical properties thereof are such that it is environmentally friendly in that its ozone layer depletion potential ODP is substantially zero, its global warming potential GWP is less than 1, and so forth. For this reason, as it is not a component which is subject to the provisions of the Ozone Layer Protection Law, the Law Concerning the Promotion of Measures to Cope with Global Warming, the Law Concerning the Discharge and Control of Fluorocarbons, the Fire Prevention Law, the High Pressure Gas Safety Law, or the like, there are no particular restrictions that apply to its use. With respect to storage thereof, it does not require a hazardous material storage warehouse, and it is not subject to legal restrictions with respect to the amounts thereof that may be stored.

On the other hand, (Z)-1-chloro-3,3,3-trifluoropropene is invasive with respect to resins. For this reason, if (Z)-1-chloro-3,3,3-trifluoropropene is, for example, allowed to act on soft polyvinyl chloride (PVC) resin or phenolic resin, this will cause said resin to deteriorate and will cause changes to occur in the weight and/or dimensions of resin products. Furthermore, if this acts on polycarbonate resin, this will cause devitrification of said resin. Moreover, if this acts on acrylic (PMMA) resin; on ABS resin, which is a synthetic copolymer resin of acrylonitrile, butadiene, and styrene; or on polystyrene resin, this will cause such resin to be dissolved. (Z)-1-chloro-3,3,3-trifluoropropene thus has poor compatibility with resin materials when used as is.

Furthermore, (Z)-1-chloro-3,3,3-trifluoropropene is also invasive with respect to various types of elastomers. For this reason, if (Z)-1-chloro-3,3,3-trifluoropropene is, for example, allowed to act on SBR, chloroprene rubber, butyl rubber, EPDM, or CSM, this will cause such elastomer to deteriorate and will cause changes to occur in the weight and/or dimensions thereof. Furthermore, if this acts on silicone rubber, natural rubber, HNBR, NBR, fluorinated rubber, or urethane rubber, this will cause such elastomer to undergo swelling. (Z)-1-chloro-3,3,3-trifluoropropene thus has poor compatibility with elastomers when used as is.

In addition, because the boiling point of (Z)-1-chloro-3,3,3-trifluoropropene is low, being 39° C., and drying occurs too quickly, it is, when used as is, unsuited as a composition for washing for use with automobiles, two-wheeled vehicles, bicycles, construction equipment, farm equipment, aircraft, railroad cars, ships, and/or various other types of car/vehicle/transportation means and so forth such as require operations in which dirt is to be moistened and then washed away therefrom.

However, the aforementioned properties of (Z)-1-chloro-3,3,3-trifluoropropene that make it inappropriate as a detergent composition for use with automobiles, two-wheeled vehicles, bicycles, construction equipment, farm equipment, aircraft, railroad cars, ships, and/or various other types of car/vehicle/transportation means and so forth, i.e., its poor compatibility with resins and the fact it dries too quickly, are, contrary to what might be expected, eliminated, making it possible to provide a more superior detergent composition, when the detergent composition is made to also contain an HFE-type nonflammable fluorinated-type solvent that has another set of properties that make it inappropriate as a detergent composition.

HFE-Type Nonflammable Fluorinated-Type Solvent

The aforementioned detergent composition and aerosol composition of same that are means in accordance with the present invention are made to contain one or more HFE-type nonflammable fluorinated-type solvents, this being the other of the two essential components that are contained therein. Such HFE-type fluorinated-type solvent(s) have no flash point and are nonflammable, neither a lower flammability limit nor an upper flammability limit being detectable. They fall within the definition of nonhazardous materials under the Fire Prevention Law, do not require a hazardous material storage warehouse, and are not subject to legal restrictions with respect to the amounts thereof that may be stored.

On the other hand, 1,1,2,2-tetrafluoro-1-(2,2,2-trifluoroethoxy)ethane and other such HFE-type nonflammable fluorinated-type solvents do not have high miscibility with respect to lipids or solvents due to the fact that the molecule does not contain therewithin any chlorine atoms such as might be highly effective in manifesting solubility with respect to various substances (Nonpatent Reference No. 2).

However, the properties of this HFE-type nonflammable fluorinated-type solvent that make it inappropriate as a detergent composition, i.e., the fact that it does not have high miscibility with respect to lipids or solvents, are, contrary to what might be expected, eliminated, making it possible to provide a more superior detergent composition, when the detergent composition is made to also contain (Z)-1-chloro-3,3,3-trifluoropropene, which has another set of properties that make it inappropriate as a detergent composition for use with various types of car/vehicle/transportation means and so forth.

As the HFE-type nonflammable fluorinated-type solvent(s) of the detergent composition and aerosol composition of same that are means in accordance with the present invention, one or more species selected from among $C_4F_9OCH_3$, $C_3F_7OCH_3$, and 1,1,2,2-tetrafluoro-1-(2,2,2-trifluoroethoxy)ethane may be used. In addition, it is preferred that one species selected from among $C_4F_9OCH_3$, $C_3F_7OCH_3$, and 1,1,2,2-tetrafluoro-1-(2,2,2-trifluoroethoxy)ethane be used, and more preferred that one species selected from between $C_4F_9OCH_3$ and $C_3F_7OCH_3$ be used.

As the 1,1,2,2-tetrafluoro-1-(2,2,2-trifluoroethoxy)ethane, substances commercially available as HFE-type nonflammable fluorinated-type solvents under the names of HFE-347pc-f, ASAHIKLIN AE-3000 (Asahi Glass Co., Ltd.; Japan), and so forth may be obtained and used. This solvent is a nonflammable solvent having no flash point (TCC, COC) and also having no combustible range. It falls within the definition of a nonhazardous material under the Fire Prevention Law, does not require a hazardous material storage warehouse, and is not subject to legal restrictions with respect to the amounts thereof that may be stored. In addition, the boiling point thereof being 56° C., it has appropriate drying characteristics.

Furthermore, as the foregoing $C_4F_9OCH_3$ HFE-type nonflammable fluorinated-type solvent, substances commercially available under the name of 3M NOVEC™ 7100 Engineered Fluid (3M Japan Limited; Japan) and so forth may be obtained and used. This solvent has no flash point and is a nonflammable solvent for which neither a lower flammability limit nor an upper flammability limit is detectable. It falls within the definition of a nonhazardous material under the Fire Prevention Law, does not require a hazardous material storage warehouse, is not subject to legal restrictions with respect to the amounts thereof that may be stored, and the chemical properties thereof are such that it is environmentally friendly in that its ozone layer depletion potential ODP is zero. This being the case, it is not subject to the provisions of the Ozone Layer Protection Law or the Law Concerning the Promotion of Measures to Cope with Global Warming. In addition, the boiling point thereof being 61° C., it has appropriate drying characteristics.

In addition, as the foregoing $C_3F_7OCH_3$ HFE-type nonflammable fluorinated-type solvent, substances commercially available under the name of 3M™ NOVEC™ 7000 Engineered Fluid (3M Japan Limited; Japan) and so forth may be obtained and used. This solvent has no flash point and is a nonflammable solvent for which neither a lower flammability limit nor an upper flammability limit is detectable. It falls within the definition of a nonhazardous material under the Fire Prevention Law, does not require a hazardous material storage warehouse, and is not subject to legal restrictions with respect to the amounts thereof that may be stored. Furthermore, its ozone layer depletion potential ODP is zero, and the chemical properties thereof are such that it is environmentally friendly. This being the case, it is not subject to the provisions of the Ozone Layer Protection Law or the Law Concerning the Promotion of Measures to Cope with Global Warming.

Mass % Ratio of (Z)-1-Chloro-3,3,3-Trifluoropropene and HFE-Type Nonflammable Fluorinated-Type Solvent In the context of the detergent composition and aerosol composition of same in accordance with the means of the present invention, based upon consideration of the fact that it is used in washing workplaces, tools, work clothes, and gloves used by workers, and/or washing automobiles, two-wheeled vehicles, bicycles, construction equipment, farm equipment, aircraft, railroad cars, ships, and/or various other types of car/vehicle/transportation means, it is preferred that the range of the mass % ratio of the two components contained therein, i.e., (Z)-1-chloro-3,3,3-trifluoropropene and HFE-type nonflammable fluorinated-type solvent(s), be adjusted so that in addition to the property whereby the solvent(s) are, in the first place, nonflammable; invasiveness with respect to resins and elastomers is moreover made lower; miscibility with respect to lipids and so forth is made higher; and in addition, washability with respect to members comprising a wide variety of materials such as metals, resins, elastomers, and so forth is made more superior; and it is imparted with an appropriate drying speed. In addition, so as to cause the detergent composition and aerosol composition of same in accordance with the means of the present invention to simultaneously have a plurality of superior properties, these being lower invasiveness with respect to resins and elastomers; higher miscibility with respect to lipids and so forth; superior washability with respect to members comprising a wide variety of materials such as metals, resins, elastomers, and so forth; and possession of appropriate drying speed, it is preferred that the range of the mass % ratios of the two components contained therein, i.e., (Z)-1-chloro-3,3,3-trifluoropropene and HFE-type nonflammable fluorinated-type solvent(s), be 50/50 to 99/1.

In addition, where the two components contained in the detergent composition and aerosol composition of same in accordance with the means of the present invention are (Z)-1-chloro-3,3,3-trifluoropropene and $C_4F_9OCH_3$, the range of the mass % ratios thereof ((Z)-1-chloro-3,3,3-trifluoropropene/$C_4F_9OCH_3$) is 50/50 to 99/1, and is preferably 70/30 to 99/1. This will make it possible to cause this to simultaneously have a plurality of superior properties, these being lower invasiveness with respect to resins and elastomers; higher miscibility with respect to lipids and so forth; superior washability with respect to members comprising a wide variety of materials such as metals, resins, elastomers, and so forth; and possession of appropriate drying speed, so that it is able to be favorably used as a detergent composition and aerosol composition of same.

Furthermore, where the two components contained in the detergent composition and aerosol composition of same in accordance with the means of the present invention are (Z)-1-chloro-3,3,3-trifluoropropene and $C_3F_7OCH_3$, the range of the mass % ratios thereof ((Z)-1-chloro-3,3,3-trifluoropropene/$C_3F_7OCH_3$ is 50/50 to 99/1, and is preferably 80/20 to 99/1. This will make it possible to cause this to simultaneously have a plurality of superior properties, these being lower invasiveness with respect to resins and elastomers; higher miscibility with respect to lipids and so forth; superior washability with respect to members comprising a wide variety of materials such as metals, resins, elastomers, and so forth; and possession of appropriate drying speed, so that it is able to be favorably used as a detergent composition and aerosol composition of same.

Moreover, where the two components contained in the detergent composition and aerosol composition of same in accordance with the means of the present invention are (Z)-1-chloro-3,3,3-trifluoropropene and 1,1,2,2-tetrafluoro-1-(2,2,2-trifluoroethoxy)ethane, the mass % ratios thereof ((Z)-1-chloro-3,3,3-trifluoropropene/1,1,2,2-tetrafluoro-1-(2,2,2-trifluoroethoxy)ethane) is 50/50 to 99/1, and is preferably 70/30 to 99/1. This will make it possible to cause this to simultaneously have a plurality of superior properties, these being lower invasiveness with respect to resins and elastomers; higher miscibility with respect to lipids and so forth; superior washability with respect to members comprising a wide variety of materials such as metals, resins, elastomers, and so forth; and possession of appropriate drying speed, so that it is able to be favorably used as a detergent composition and aerosol composition of same.

Other Components

In addition to the aforementioned two major components of the detergent composition, a detergent composition and aerosol composition of same in accordance with the means of the present invention may furthermore, where necessary, have blended therewithin additional component(s) to the extent that these do not increase the hazard of ignition or the risk during fire. Where the foregoing additional component(s) are blended therewithin, they are to be blended therewithin in such ranges as will permit the properties whereby the detergent composition is nonflammable and falls within the definition of a nonhazardous material under the Fire Prevention Law to be maintained, and such as will permit the properties that are achieved by the two major components, which is the reduction of the invasiveness with respect to resins and elastomers that (Z)-1-chloro-3,3,3-trifluoropropene would have were it to be used as is and the possession of washability with respect to lipid components and appropriate drying speed, to be maintained. As such additional component(s), alcohols, saturated phydrocarbons, unsaturated hydrocarbons, aromatic hydrocarbons, stabilizers, chelating agents, and/or the like may be used; for example, substances in which 3M™ NOVEC™ 7200, 3M™ NOVEC™ 7300, and other such HFE-type solvents, methanol, ethanol, isopropyl alcohol, butanol, and other such alcohols, normal hexane, cyclohexane, isohexane, and other such hydrocarbon-type solvents, acetone, MEK, cyclohexanone, and other such ketone-type solvents, ethyl acetate, methyl acetate, butyl acetate, ethylene glycol monomethyl ether acetate, and other such ester- and glycol ester-type solvents, methyl cellosolve, butyl cellosolve, methoxymethylbutanol, hexyl diglycol, and other such ether- and glycol ether-type solvents, ethylene glycol dimethyl ether, diethylene glycol dimethyl ether, and other such glyme-type solvents, HCFC-141b, HCFC-225, 1-bromopropane, chloroform, and other such chlorine-type solvents, N-methyl-2-pyrrolidone, tetrahydrofuran, dimethylformamide, and other such specialty solvents, γ-butyrolactone, 1,3-dioxolane, dimethyl sulfoxide, and/or such other solvents are blended therein may be used.

Aerosol Composition

As the gas propellant in the aerosol composition, liquefied gas or compressed gas may be used. For example, LPG (liquefied petroleum gas), DME (dimethyl ether), carbon dioxide gas, fluorocarbon-type gas, nitrogen gas, compressed air, and other such gases, a mixture of LPG and DME, a mixture of LPG and carbon dioxide gas, and other such combinations of two or more of the foregoing gases may be cited as examples. In addition, a detergent composition in accordance with the means of the present invention may be mixed with any of the foregoing gas propellants to form an aerosol composition, and this may be used to fill a pressure-resistant can, in which form it may be provided.

Method of Use

A solution of the detergent composition in accordance with the means of the present invention may be used by applying it to workplaces, tools, work clothes, and gloves used by workers, and/or members comprising a wide variety of materials such as metals, resins, elastomers, and so forth in automobiles, two-wheeled vehicles, bicycles, construction equipment, farm equipment, aircraft, railroad cars, ships, and various other types of car/vehicle/transportation means serving as items to be washed, or may be used by causing any of such items to be washed to be immersed in a solution of the detergent composition. Furthermore, a pressure-resistant can may be filled with an aerosol composition in which detergent composition in accordance with the means of the present invention is mixed with liquefied gas serving as gas propellant to aerosolize it—or detergent composition in accordance with the means of the present invention may be placed in a pail, a small mobile dispenser may be provided at the workplace where this is to be used, and compressed air may be used to aerosolize the detergent composition that has been placed in the pail—and this may be used by causing it to be sprayed in the form of an aerosol on members comprising a wide variety of materials such as metals, resins, elastomers, and so forth serving as items to be washed.

WORKING EXAMPLES

Indicated below in the form of working examples and exemplary tests are examples of manufacture and use of detergent compositions and aerosol compositions of same in accordance with the present invention.

Test Samples

To prepare test samples, components used in the detergent composition of the present invention and conventional detergents were purchased.

The following components used in the detergent composition in accordance with the present invention respectively were purchased: 1233Z (Central Glass Co., Ltd.; Japan) serving as (Z)-1-chloro-3,3,3-trifluoropropene; ASAHIKLIN AE-3000 (Asahi Glass Co., Ltd.; Japan) serving as the HFE-type nonflammable fluorinated-type solvent 1,1,2,2-tetrafluoro-1-(2,2,2-trifluoroethoxy)ethane; 3M™ NOVEC™ 7000 Engineered Fluid (3M Japan Limited; Japan) serving as the HFE-type nonflammable fluorinated-type solvent $C_3F_7OCH_3$; and 3M™ NOVEC™ 7100 Engineered Fluid (3M Japan Limited; Japan) serving as the HFE-type nonflammable fluorinated-type solvent $C_4F_9OCH_3$.

Furthermore, as conventional detergents, Brake and Parts Cleaner (Quick-Drying Type) (Kobegosei Co., Ltd.; Japan) employing isohexane serving as quick-drying stock solution; moreover, the following were respectively purchased: Degreasing Cleaner (Honda Access Corporation; Japan) employing cyclohexane which was used as degreasing cleaner; the isoparaffinic solvent Brake Cleaner N04 (Suzuki Motor Corporation; Japan) serving as air-dry stock solution; and also trichloroethane.

In addition, the mass % ratios of (Z)-1-chloro-3,3,3-trifluoropropene and the foregoing respective HFE-type nonflammable fluorinated-type solvents were varied as indicated below so as to respectively manufacture detergent compositions in the form of Working Example 1 through Working Example 20 that were detergent compositions containing (Z)-1-chloro-3,3,3-trifluoropropene and HFE-type nonflammable fluorinated-type solvent in accordance with the present invention.

Mass % Ratios (1233Z/AE-3000)

Working Example 1: 30/70
Working Example 2: 50/50
Working Example 3: 70/30
Working Example 4: 80/20
Working Example 5: 85/15
Working Example 6: 90/10
Working Example 20: 99/1

Mass % Ratios (1233Z/NOVEC 7000)

Working Example 7: 30/70
Working Example 8: 50/50
Working Example 9: 70/30
Working Example 10: 80/20
Working Example 11: 90/10
Working Example 12: 95/5

Mass % Ratios (1233Z/NOVEC 7100)

Working Example 13: 30/70
Working Example 14: 50/50
Working Example 15: 70/30
Working Example 16: 80/20
Working Example 17: 85/15
Working Example 18: 90/10

Working Example 19: 99/1

Furthermore, the following Comparative Examples 1 through 4 were prepared. Note that the quick-drying stock solution, the degreasing cleaner, and the air-dry stock solution were all highly combustible; that the trichloroethane was highly harmful; and that these all had properties that would be problematic in the context of a composition for washing.

Comparative Example 1

Quick-drying stock solution

Comparative Example 2

Degreasing Cleaner

Comparative Example 3

Air-Dry Stock Solution

Comparative Example 4

Trichloroethane

Moreover, the following Comparative Examples 5 through 8 were prepared for comparison with the respective working examples in which the two components (Z)-1-chloro-3,3,3-trifluoropropene and HFE-type nonflammable fluorinated-type solvent were blended together.

Comparative Example 5

1233Z alone

Comparative Example 6

AE-3000 alone

Comparative Example 7

NOVEC 7000 alone

Comparative Example 8

NOVEC 7100 alone

Next, Exemplary Test 1 through Exemplary Test 6 indicated below were carried out, and it was confirmed in specific terms that the detergent compositions and aerosol compositions of same in accordance with the means of the present invention had properties that were superior to those of conventional detergents.

Exemplary Test 1: Evaluation of Miscibility with Grease and Oil

Materials and Methods

As test solutions, solutions in accordance with Working Examples 1 through 18 and Comparative Examples 1 through 8 were prepared.

As the lipids to be washed and removed, the various types of greases and oils indicated below which are in general use in automobiles and so forth were prepared.

Grease: GREASE (Orange) (Kobegosei Co., Ltd.; Japan)
- Rubber and Brake Dual-Purpose Grease (Kobegosei Co., Ltd.; Japan)
- Disc Brake Grease (Kobegosei Co., Ltd.; Japan)
- Brake Grease (Kobegosei Co., Ltd.; Japan)
- Silicone Grease (Kobegosei Co., Ltd.; Japan)
- Caliper Pin Grease (Honda Access Corporation; Japan)
- Pad & Shoe Grease (Honda Access Corporation; Japan)
- Rubber Grease (Honda Access Corporation; Japan)
- Brake Grease (Honda Access Corporation; Japan)

Oil: Engine Oil Mobil 1 0 W-20 (Exxon Mobil; USA)
- Brake Fluid (DOT3) (Honda Access Corporation; Japan)
- Brake Fluid (DOT4) (Suzuki Motor Corporation; Japan)

Twenty-six 10 mL vials were prepared, 1 g of the foregoing grease or engine oil being placed into each one thereof 5 mL of each of the solutions according to Working Examples 1 through 18 and Comparative Examples 1 through 8 was further added to the vials, and the caps of the vials were closed. Each of the vials was subjected to ultrasonic processing for 1 hour using an ultrasonic washer (AU16C; Aiwa Medical Industry Co., Ltd.; Japan).

Following ultrasonic processing for 1 hour, the respective vials were removed from the ultrasonic washer. The interiors of the vials were examined, miscibility being evaluated as GOOD if the grease or engine oil and the solutions according to each of Working Examples 1 through 18 and Comparative Examples 1 through 8 were completely mixed, FAIR if these were partly separated, and BAD if these were completely separated.

Test Results

Results of tests carried out as described above are shown at TABLE 1-1 through TABLE 1-4.

TABLE 1-1

| | Working Examples | | | | | |
|---|---|---|---|---|---|---|
| | 1 | 2 | 3 | 4 | 5 | 6 |
| Component | 1233Z/AE3000 | | | | | |
| Mass % ratio | 30/70 | 50/50 | 70/30 | 80/20 | 85/15 | 90/10 |
| GREASE (Orange) | BAD | BAD | BAD | BAD | BAD | GOOD |
| Rubber and Brake Dual-Purpose Grease | GOOD | GOOD | GOOD | GOOD | GOOD | GOOD |
| Disc Brake Grease | BAD | BAD | BAD | BAD | BAD | BAD |
| Brake Grease | BAD | GOOD | GOOD | GOOD | GOOD | GOOD |
| Silicone Grease | BAD | BAD | GOOD | GOOD | GOOD | GOOD |
| Caliper Pin Grease | FAIR | GOOD | GOOD | GOOD | GOOD | GOOD |
| Pad & Shoe Grease | BAD | GOOD | GOOD | GOOD | GOOD | GOOD |
| Rubber Grease | BAD | BAD | FAIR | GOOD | GOOD | GOOD |
| Brake Grease | GOOD | GOOD | GOOD | GOOD | GOOD | GOOD |
| Mobil1 OW-20 | BAD | BAD | BAD | BAD | BAD | BAD |
| Brake Fluid (DOT3) | GOOD | GOOD | GOOD | GOOD | GOOD | GOOD |
| Brake Fluid (DOT4) | GOOD | GOOD | GOOD | GOOD | GOOD | GOOD |

TABLE 1-2

| Component | Working Examples | | | | | |
|---|---|---|---|---|---|---|
| | 7 | 8 | 9 | 10 | 11 | 12 |
| | 1233Z/7000 | | | | | |
| Mass % ratio | 30/70 | 50/50 | 70/30 | 80/20 | 90/10 | 95/5 |
| GREASE (Orange) | BAD | GOOD | GOOD | GOOD | GOOD | GOOD |
| Rubber and Brake Dual-Purpose Grease | GOOD | GOOD | GOOD | GOOD | GOOD | GOOD |
| Disc Brake Grease | BAD | BAD | BAD | BAD | BAD | BAD |
| Brake Grease | BAD | BAD | GOOD | GOOD | GOOD | GOOD |
| Silicone Grease | BAD | GOOD | GOOD | GOOD | GOOD | GOOD |
| Caliper Pin Grease | BAD | GOOD | GOOD | GOOD | GOOD | GOOD |
| Pad & Shoe Grease | GOOD | GOOD | GOOD | GOOD | GOOD | GOOD |
| Rubber Grease | BAD | FAIR | FAIR | GOOD | GOOD | GOOD |
| Brake Grease | GOOD | GOOD | GOOD | GOOD | GOOD | GOOD |
| Mobil1 OW-20 | BAD | BAD | BAD | BAD | FAIR emulsification | BAD partial emulsification |
| Brake Fluid (DOT3) | GOOD | GOOD | GOOD | GOOD | GOOD | GOOD |
| Brake Fluid (DOT4) | GOOD | GOOD | GOOD | GOOD | GOOD | GOOD |

TABLE 1-3

| Component | Working Examples | | | | | |
|---|---|---|---|---|---|---|
| | 13 | 14 | 15 | 16 | 17 | 18 |
| | 1233Z/7100 | | | | | |
| Mass % ratio | 30/70 | 50/50 | 70/30 | 80/20 | 85/15 | 90/10 |
| GREASE (Orange) | BAD | BAD | GOOD | | | GOOD |
| Rubber and Brake Dual-Purpose Grease | GOOD | GOOD | GOOD | | | GOOD |
| Disc Brake Grease | BAD | BAD | BAD | | | FAIR |
| Brake Grease | BAD | FAIR | GOOD | | | GOOD |
| Silicone Grease | BAD | BAD | GOOD | | | GOOD |
| Caliper Pin Grease | BAD | BAD | GOOD | | | GOOD |
| Pad & Shoe Grease | BAD | GOOD | GOOD | | | GOOD |
| Rubber Grease | BAD | BAD | BAD | | | GOOD |
| Brake Grease | GOOD | GOOD | GOOD | | | GOOD |
| Mobil1 OW-20 | BAD | BAD partial emulsification | BAD partial emulsification | BAD partial emulsification | | BAD partial emulsification |
| Brake Fluid (DOT3) | GOOD | GOOD | GOOD | | | GOOD |
| Brake Fluid (DOT4) | GOOD | GOOD | GOOD | | | GOOD |

TABLE 1-4

| Component | Comparative Examples | | | | | | | |
|---|---|---|---|---|---|---|---|---|
| | 1 Quick-drying stock solution | 2 Degreasing cleaner | 3 Air-dry stock solution | 4 Trichloroethane | 5 1233Z alone | 6 AE3000 alone | 7 7000 alone | 8 7100 alone |
| GREASE (Orange) | BAD | BAD | BAD | GOOD | GOOD | FAIR | BAD | BAD |
| Rubber and Brake Dual-Purpose Grease | GOOD | GOOD | GOOD | GOOD | GOOD | BAD | BAD | BAD |
| Disc Brake Grease | FAIR | FAIR | FAIR | GOOD | FAIR | BAD | BAD | BAD |
| Brake Grease | GOOD | GOOD | GOOD | GOOD | GOOD | BAD | BAD | BAD |
| Silicone Grease | GOOD | GOOD | GOOD | GOOD | GOOD | BAD | BAD | BAD |
| Caliper Pin Grease | GOOD | GOOD | GOOD | GOOD | GOOD | FAIR | BAD | BAD |
| Pad & Shoe Grease | GOOD | GOOD | GOOD | GOOD | GOOD | BAD | BAD | BAD |
| Rubber Grease | FAIR | FAIR | FAIR | GOOD | GOOD | BAD | BAD | BAD |
| Brake Grease | GOOD | GOOD | GOOD | GOOD | FAIR | BAD | BAD | BAD |
| Mobil1 OW-20 | GOOD | GOOD | GOOD | GOOD | GOOD | BAD | BAD | BAD |
| Brake Fluid (DOT3) | BAD | GOOD | GOOD | GOOD | GOOD | GOOD | BAD | BAD |
| Brake Fluid (DOT4) | BAD | GOOD | GOOD | GOOD | GOOD | GOOD | BAD | BAD |

Because the various HFE-type nonflammable fluorinated-type solvents were almost completely lacking in miscibility with respect to grease or brake oil (Comparative Example 6 through Comparative Example 9 at TABLE 1-4), they were inappropriate for use as detergent for removal of dirt in the form of grease, brake oil, and/or other such lipid component(s).

Furthermore, while (Z)-1-chloro-3,3,3-trifluoropropene had a suitable degree of miscibility, because, as clear from the test results at Exemplary Test 3 and Exemplary Test 4 which are described below, it exhibited invasiveness with respect to resins and elastomers, it was that make it unsuitable as a detergent composition for use with various types of car/vehicle/transportation means and so forth. Thus, the various HFE-type nonflammable fluorinated-type solvents and (Z)-1-chloro-3,3,3-trifluoropropene were each lacking in any motivation that might have urged for their addition to a detergent composition for use with various types of car/vehicle/transportation means.

However, the present results (TABLE 1-1 through TABLE 1-3) also made clear that if a substance is made to contain an HFE-type nonflammable fluorinated-type solvent—which cannot be used to wash the foregoing various types of car/vehicle/transportation means—together with (Z)-1-chloro-3,3,3-trifluoropropene, it surprisingly was found to display miscibility with respect to a broad range of lipid components including grease, brake oil, and so forth, which is to say that it exhibited a high degree of washability with respect to such lipid components. Furthermore, it was also learned that miscibility was exhibited over a broad range of mass % ratios of the (Z)-1-chloro-3,3,3-trifluoropropene and the HFE-type nonflammable fluorinated-type solvents.

Furthermore, with respect to conventional detergents, there were cases in which there was lack of miscibility with respect to GREASE (Orange), Rubber Grease, Brake Fluid (DOT3), Brake Fluid (DOT4), and so forth (TABLE 1-4). However, as indicated at TABLE 1-1 through TABLE 1-3, it was found that causing HFE-type nonflammable fluorinated-type solvents—each of which was almost completely lacking in miscibility with respect to grease or brake oil—to be contained therein together with (Z)-1-chloro-3,3,3-trifluoropropene made it possible to achieve a hitherto unachievable miscibility that was exhibited even with respect to such GREASE (Orange), Rubber Grease, Brake Fluid (DOT3), Brake Fluid (DOT4), and other such greases and brake oils (TABLE 1-1 through TABLE 1-3).

It can therefore be understood that by thus causing a composition for washing to contain (Z)-1-chloro-3,3,3-trifluoropropene and HFE-type nonflammable fluorinated-type solvent as in the present invention, it will be possible to provide a novel detergent composition that exhibits miscibility with respect to a broad range of greases and brake oils, and that while being nonflammable and low in toxicity also has superior washing properties that are as good as or better than those of conventional brake cleaners.

Exemplary Test 2: Evaluation of Drying Characteristics

Materials and Methods

In similar fashion as at Exemplary Test 1, solutions in accordance with the aforementioned Working Examples 1 through 18 and Comparative Examples 1 through 8 were respectively prepared.

Temperature conditions at a Temperature & Humidity Chamber (HPAV-120-40; Isuzu Seisakusho Co., Ltd.; Japan) were adjusted to be 70% humidity and 45° C., 25° C., or 10° C., 2-cm flat dishes were placed therein, and these were allowed to stand. When the temperatures of the flat dishes had stabilized, 100 μL of each of the solutions according to Working Examples 1 through 18 and Comparative Examples 1 through 8 was placed in a flat dish, and visual inspection was employed to measure the time until the droplet of solution in each flat dish had completely evaporated and dried.

Test Results

Results of tests carried out as described above are shown at TABLE 2-1 through TABLE 2-4.

TABLE 2-1

| | | | Working Examples | | | | | |
|---|---|---|---|---|---|---|---|---|
| | | | 1 | 2 | 3 | 4 | 5 | 6 |
| | Component | | 1233Z/AE3000 | | | | | |
| | Mass % ratio | Standard value | 30/70 | 50/50 | 70/30 | 80/20 | 85/15 | 90/10 |
| High-temperature ambient conditions (40° C., 70%) | Surface temperature (° C.) | 40.0 ± 0.5 | 40.2 | 40.3 | 40.2 | | 40.2 | 39.8 |
| | Drying time (min sec) | 1' to 2' | 1' 35" | 1' 30" | 1' 23" | | 1' 14" | 1' 02" |
| Normal-temperature ambient conditions (25° C., 70%) | Surface temperature (° C.) | 25.0 ± 0.5 | 25.0 | 25.1 | 25.3 | | 25.0 | 25.2 |
| | Drying time (min sec) | 2' to 3' | 2' 26" | 2' 18" | 2' 06" | | 1' 45" | 1' 44" |
| Low-temperature ambient conditions (10° C., 70%) | Surface temperature (° C.) | 10.0 ± 0.5 | 10.0 | 10.0 | 10.3 | | 10.0 | 10.1 |
| | Drying time (min sec) | 3' to 4' | 4' 03" | 3' 39" | 3' 15" | | 3' 03" | 2' 52" |

TABLE 2-2

| | Component | | Working Examples | | | | | |
|---|---|---|---|---|---|---|---|---|
| | | | 7 | 8 | 9 | 10 | 11 | 12 |
| | | | 1233Z/7000 | | | | | |
| | Mass % ratio | Standard value | 30/70 | 50/50 | 70/30 | 80/20 | 90/10 | 95/5 |
| High-temperature ambient conditions (40° C., 70%) | Surface temperature (° C.) | 40.0 ± 0.5 | 40.0 | 40.0 | 40.2 | 40.0 | 40.0 | 40.0 |
| | Drying time (min sec) | 1' to 2' | 0' 30" | 0' 34" | 0' 38" | 0' 38" | 0' 39" | 0' 40" |
| Normal-temperature ambient conditions (25° C., 70%) | Surface temperature (° C.) | 25.0 ± 0.5 | 25.3 | 25.0 | 25.1 | 25.3 | 25.1 | 25.3 |
| | Drying time (min sec) | 2' to 3' | 0' 51" | 1' 04" | 1' 00" | 1' 05" | 1' 10" | 1' 29" |
| Low-temperature ambient conditions (10° C., 70%) | Surface temperature (° C.) | 10.0 ± 0.5 | 10.1 | 10.0 | 10.0 | 10.0 | 10.0 | 10.0 |
| | Drying time (min sec) | 3' to 4' | 1' 13" | 1' 21" | 1' 30" | 1' 39" | 1' 54" | 2' 16" |

TABLE 2-3

| | Component | | Working Examples | | | | | |
|---|---|---|---|---|---|---|---|---|
| | | | 13 | 14 | 15 | 16 | 17 | 18 |
| | | | 1233Z/7100 | | | | | |
| | Mass % ratio | Standard value | 30/70 | 50/50 | 70/30 | 80/20 | 85/15 | 90/10 |
| High-temperature ambient conditions (40° C., 70%) | Surface temperature (° C.) | 40.0 ± 0.5 | 40.2 | 40.3 | 40.8 | 40.4 | | 40.0 |
| | Drying time (min sec) | 1' to 2' | 1' 30" | 1' 26" | 1' 21" | 1' 10" | | 1' 01" |
| Normal-temperature ambient conditions (25° C., 70%) | Surface temperature (° C.) | 25.0 ± 0.5 | 25.0 | 25.1 | 25.4 | 25.3 | | 25.3 |
| | Drying time (min sec) | 2' to 3' | 2' 18" | 2' 13" | 2' 06" | 1' 54" | | 1' 43" |
| Low-temperature ambient conditions (10° C., 70%) | Surface temperature (° C.) | 10.0 ± 0.5 | 10.0 | 10.0 | 10.2 | 10.2 | | 10.1 |
| | Drying time (min sec) | 3' to 4' | 3' 46" | 3' 21" | 3' 01" | 2' 38" | | 2' 29" |

TABLE 2-4

| | | | Comparative Examples | | | | | | | |
|---|---|---|---|---|---|---|---|---|---|---|
| | Component Mass % ratio | Standard value | 1 Quick-drying stock solution | 2 De-greasing cleaner | 3 Air-dry stock solution | 4 Trichloro-ethane | 5 1233Z alone | 6 AE3000 alone | 7 7000 alone | 8 7100 alone |
| High-temperature ambient conditions (40° C., 70%) | Surface temperature (° C.) | 40.0 ± 0.5 | 39.8 | 40.0 | 40.0 | 40.1 | 39.9 | 39.9 | 40.0 | 39.9 |
| | Drying time (min sec) | 1' to 2' | 1' 36" | 3' 48" | >15' 00" | 4' 10" | 0' 57" | 1' 53" | 0' 25" | 1' 49" |
| Normal-temperature ambient conditions (25° C., 70%) | Surface temperature (° C.) | 25.0 ± 0.5 | 25.0 | 25.1 | 25.1 | 25.0 | 25.2 | 25.2 | 25.3 | 25.0 |
| | Drying time (min sec) | 2' to 3' | 2' 11" | 5' 58" | >15' 00" | 7' 28" | 1' 37" | 2' 55" | 0' 41" | 2' 34" |
| Low-temperature ambient conditions (10° C., 70%) | Surface temperature (° C.) | 10.0 ± 0.5 | 10.2 | 10.0 | 10.0 | 10.0 | 10.0 | 10.4 | 10.1 | 10.1 |
| | Drying time (min sec) | 3' to 4' | 3' 54" | 6' 38" | >10' 00" | 9' 25" | 2' 14" | 5' 13" | 1' 08" | 4' 31" |

In the context of a detergent composition for which satisfactory ease of operations and safety are needed, it is ordinarily preferred that the optimal time required for drying be 1 minute to 2 minutes under high-temperature ambient conditions of 40° C., 2 minutes to 3 minutes under normal-temperature ambient conditions of 25° C., and 3 minutes to 4 minutes under low-temperature ambient conditions of 10° C. With the conventional detergents, only those of the quick-drying stock solution type were able to achieve such conditions, the others requiring excessive amounts of time to dry (TABLE 2-4). But while these which were of the quick-drying stock solution type had short drying times, inasmuch as they were highly flammable they were problematic from the standpoint of ensuring the high degree of safety needed for the detergent composition.

As is clear from Exemplary Test 1, a detergent composition containing (Z)-1-chloro-3,3,3-trifluoropropene and HFE-type nonflammable fluorinated-type solvent in accordance with the means of the present invention is a nonflammable detergent composition having superior properties with respect to lipid components. Investigation was therefore carried out to determine what sort of drying times could be achieved with a detergent composition containing (Z)-1-chloro-3,3,3-trifluoropropene and HFE-type nonflammable fluorinated-type solvent.

As a result, it was found that while the drying time of (Z)-1-chloro-3,3,3-trifluoropropene was somewhat short (TABLE 2-4), when 1,1,2,2-tetrafluoro-1-(2,2,2-trifluoroethoxy)ethane (AE-3000) or $C_4F_9OCH_3$ (NOVEC™ 7100) was used as HFE-type nonflammable fluorinated-type solvent which was made to be contained therein together therewith, it was possible to obtain a substance capable of ensuring ordinary times for operations (TABLE 2-1 and TABLE 2-3). Furthermore, it was found that when $C_3F_7OCH_3$ (NOVEC™ 7000) was used, it was possible to obtain a detergent composition that dried quickly (TABLE 2-2). It is clear that it was possible to adjust the type of HFE-type nonflammable fluorinated-type solvent and the mass % ratio of (Z)-1-chloro-3,3,3-trifluoropropene and HFE-type nonflammable fluorinated-type solvent so as to achieve a substance having the drying speed that is desired depending on the site at which it will be used.

Exemplary Test 3: Evaluation of Invasiveness (Long-Term)

Materials and Methods

In similar fashion as at Exemplary Test 1, solutions in accordance with the aforementioned Working Examples 1 through 18 and Comparative Examples 1 through 8 were respectively prepared. Furthermore, the test pieces indicated below were prepared for the purpose of evaluating invasiveness.

Rubber: NR (natural rubber)
CR (chloroprene rubber)
SBR (styrene-butadiene rubber)
EPDM (ethylene-propylene rubber)

(All of the above were obtained from Standard Test Piece Co., Ltd., of Japan.)

Resin: ABS (acrylonitrile-butadiene-styrene)
LDPE (low-density polyethylene)
PC (polycarbonate)

(All of the above were obtained from Nippon Testpanel Co., Ltd.)

Weight of each of the foregoing rubber or resin test pieces (10 mm×10 mm×2 mm in size) was measured.

Next, 20 mL of each of the solutions according to Working Examples 1 through 18 and Comparative Examples 1 through 8 was placed in vials, the foregoing rubber and resin test pieces (10 mm×10 mm×2 mm in size) being immersed therewithin, and the vials were placed within a Temperature & Humidity Chamber (HPAV-120-40; Isuzu Seisakusho Co., Ltd.; Japan) set to 45° C. and allowed to stand for 1 month.

After 1 month, the test pieces were removed from the vials and the condition of the surfaces thereof was inspected, following which weights and thicknesses of the test pieces were measured, the percent swelling was calculated to determine whether this was within the range ±5.0%, and examination was carried out to see whether there was reduction in the transparency of the PC.

Test Results

Results of tests carried out as described above are shown at TABLE 3-1 through TABLE 3-4.

TABLE 3-1

| | | | Working Examples | | | | | |
|---|---|---|---|---|---|---|---|---|
| | | | 1 | 2 | 3 | 4 | 5 | 6 |
| | Component | | 1233Z/AE3000 | | | | | |
| | Mass % ratio | Standard | 30/70 | 50/50 | 70/30 | 80/20 | 85/15 | 90/10 |
| Rubber | NR | <±5.0 | 0.5 | 1.5 | 0.2 | | 1.2 | 1.4 |
| | CR | <±5.0 | 0.3 | 0.0 | −0.5 | | −0.5 | 0.5 |
| | SBR | <±5.0 | 2.5 | 4.3 | 4.7 | | 4.4 | 4.5 |
| | EPDM | <±5.0 | | | 1.4 | | | |
| Resin | ABS | <±5.0 | 8.3 | FAIR (softening) | FAIR (softening) | | FAIR (softening) | FAIR (softening) |
| | LDPE | <±5.0 | 0.5 | 0.0 | 0.0 | | 15.4 | 18.1 |
| | PC | <±5.0 | 1.2 | 5.1 | 7.8 | | Whitening | Whitening |
| | | Transparent | Transparent | Whitening | Whitening | | | |

TABLE 3-2

| | | | Working Examples | | | | | |
|---|---|---|---|---|---|---|---|---|
| | | | 7 | 8 | 9 | 10 | 11 | 12 |
| | Component | | 1233Z/7000 | | | | | |
| | Mass % ratio | Standard | 30/70 | 50/50 | 70/30 | 80/20 | 90/10 | 95/5 |
| Rubber | NR | <±5.0 | 1.5 | 1.2 | 0.7 | 2.5 | 3.2 | 3.7 |
| | CR | <±5.0 | 0.7 | −0.3 | 0.0 | −0.1 | 0.8 | 1.5 |
| | SBR | <±5.0 | 2.5 | −0.5 | 4.3 | 5.0 | 5.0 | 4.5 |

TABLE 3-2-continued

| | Component | | Working Examples | | | | | |
|---|---|---|---|---|---|---|---|---|
| | | | 7 | 8 | 9 | 10 | 11 | 12 |
| | | | 1233Z/7000 | | | | | |
| | Mass % ratio | Standard | 30/70 | 50/50 | 70/30 | 80/20 | 90/10 | 95/5 |
| Resin | ABS | <±5.0 | 0.0 | 5.8 | 32.0 | FAIR (softening) | FAIR (softening) | FAIR (softening) |
| | LDPE | <±5.0 | 1.3 | −1.0 | 1.0 | 0.5 | 2.0 | 3.4 |
| | PC | <±5.0 | 1.0 | 2.0 | 13.7 | 14.1 | 22.1 | 26.0 |
| | | Transparent | Transparent | Transparent | Whitening | Whitening | Whitening | Whitening |

TABLE 3-3

| | Component | | Working Examples | | | | | |
|---|---|---|---|---|---|---|---|---|
| | | | 13 | 14 | 15 | 16 | 17 | 18 |
| | | | 1233Z/7100 | | | | | |
| | Mass % ratio | Standard | 30/70 | 50/50 | 70/30 | 80/20 | 85/15 | 90/10 |
| Rubber | NR | <±5.0 | 1.7 | 0.1 | 1.5 | 2.2 | | 3.9 |
| | CR | <±5.0 | 1.0 | 0.0 | −0.5 | 0.2 | | 0.5 |
| | SBR | <±5.0 | 3.0 | 3.9 | 4.0 | 4.9 | | 6.0 |
| | EPDM | <±5.0 | | | 0.6 | | | |
| Resin | ABS | <±5.0 | 0.2 | FAIR (softening) | FAIR (softening) | FAIR (softening) | | FAIR (softening) |
| | LDPE | <±5.0 | 0.5 | 1.3 | 1.0 | 0.5 | | 1.0 |
| | PC | <±5.0 | 0.2 | −1.0 | 13.1 | 22.1 | | 28.4 |
| | | Transparent | Transparent | Transparent | Whitening | Whitening | | Whitening |

TABLE 3-4

| | Component Mass % ratio | Standard | Comparative Examples 1 Quick-drying stock solution | 2 De-greasing cleaner | 3 Air-dry stock solution | 4 Trichloro-ethane | 5 1233Z alone | 6 AE3000 alone | 7 7000 alone | 8 7100 alone |
|---|---|---|---|---|---|---|---|---|---|---|
| Rubber | NR | <±5.0 | 15.9 | 21.1 | 30.4 | 44.3 | 3.9 | 0.0 | −0.7 | −0.2 |
| | CR | <±5.0 | 8.2 | 10.6 | 22.8 | 36.9 | 2.8 | 0.5 | −1.0 | −0.3 |
| | SBR | <±5.0 | 27.4 | 40.0 | 32.8 | 42.8 | 7.0 | 0.0 | 0.0 | −0.5 |
| | EPDM | <±5.0 | 31.8 | 31.8 | 42.8 | 36.6 | 0.0 | 0.2 | 0.5 | 0.7 |
| Resin | ABS | <±5.0 | −0.2 | 46.2 | 4.2 | BAD (disso-lution) | BAD (disso-lution) | −0.7 | −1.2 | 0.2 |
| | LDPE | <±5.0 | 4.6 | 8.0 | 2.8 | 7.3 | 2.3 | 0.5 | −0.5 | 0.3 |
| | PC | <±5.0 | −0.5 | 0.2 | 0.0 | 84.1 | 26.8 | 0.7 | −0.2 | 0.2 |
| | | Transparent | Transparent | Transparent | Transparent | Whitening Cracking | Whitening | Transparent | Transparent | Transparent |

At Exemplary Test 1 and Exemplary Test 2, it was confirmed that a composition containing (Z)-1-chloro-3,3,3-trifluoropropene and HFE-type nonflammable fluorinated-type solvent is capable of possessing satisfactory and suitable drying characteristics, as well as superior miscibility with respect to lipid components. At Exemplary Test 3, comparative testing was carried out under the accelerated treatment conditions of 1 month at 45° C. to determine whether a composition containing (Z)-1-chloro-3,3,3-trifluoropropene and HFE-type nonflammable fluorinated-type solvent showed improvement in the invasiveness that (Z)-1-chloro-3,3,3-trifluoropropene has with respect to rubber and resin, and to compare the noninvasiveness thereof with that of conventional detergents with respect to rubber and resin.

(Z)-1-chloro-3,3,3-trifluoropropene exhibited invasiveness when allowed to act over a long period of time on rubber or resin; in particular, SBR (styrene-butadiene rubber) experienced swelling; ABS (acrylonitrile-butadiene-styrene) was made to dissolve; and PC (polycarbonate) displayed a high degree of invasiveness in the form of swelling, whitening, cracking, and so forth—these all being in general use in devices and components that are important for ensuring safety in the context of various types of car/vehicle/transportation means and so forth, and the degree of deterioration of such rubbers and resins all being to such an extent as to make it impossible to maintain the quality necessary for these to serve as product (TABLE 3-4). Furthermore, the conventional detergents also exhibited a high degree of invasiveness when allowed to act over a long period of time on rubbers such as NR (natural rubber), CR (chloroprene rubber), SBR, and EPDM (ethylene-propylene rubber), and resins such as ABS, LDPE (low-density polyethylene), and PC, this similarly being to such an extent as to make it impossible to maintain the quality necessary for these to serve as product (TABLE 3-4).

However, it was found that when 1,1,2,2-tetrafluoro-1-(2,2,2-trifluoroethoxy)ethane (AE-3000), $C_3F_7OCH_3$; (NOVEC™ 7000), $C_4F_9OCH_3$ (NOVEC™ 7100), or other such HFE-type nonflammable fluorinated-type solvent was blended with (Z)-1-chloro-3,3,3-trifluoropropene, it was surprisingly found that it was possible to eliminate the foregoing phenomena of swelling, dissolution, whitening, and cracking in the various types of rubbers and resins that had been observed during use of (Z)-1-chloro-3,3,3-trifluoropropene (TABLE 3-1 through TABLE 3-3).

It can be understood that the present invention—which makes it possible to manufacture a detergent composition having novel properties, i.e., that invasiveness is not exhibited with respect to various types of rubbers and resins in general use in devices and components that are important for ensuring safety in various types of car/vehicle/transportation means—provides an extremely effective means for replacement of conventional detergents that exhibit invasiveness. Furthermore, it can be understood that, even where a detergent composition in accordance with the means of the present invention continues to be used over a long period of time, there is very little concern that there will be occurrence of invasiveness with respect to rubber or resin.

Of the foregoing rubbers, because SBR (styrene-butadiene rubber) is also employed in tires and seals for automotive brake fluid systems and so forth, it is desired that detergents which are used to wash brake equipment and regions peripheral thereto have low erosivity with respect to SBR. However, increasing the amount of HFE-type nonflammable fluorinated-type solvent that is blended therewith in an attempt to eliminate the problem of the erosivity of (Z)-1-chloro-3,3,3-trifluoropropene with respect to SBR as described above will cause an increase in product cost. Investigation was therefore carried out to determine whether there might be latitude to further reduce the amount of HFE-type nonflammable fluorinated-type solvent that is blended therewith.

Solutions in which the amount of HFE-type nonflammable fluorinated-type solvent blended therein was further reduced were therefore respectively prepared in the form of Working Example 19 (mass % ratio (1233Z/NOVEC 7100) =99/1) and Working Example 20 (mass % ratio (1233Z/AE-3000)=99/1), 5 g of each respectively being placed in vials. SBR test pieces, the thicknesses of which had been weighed, were immersed therein, and these were allowed to stand at the accelerated treatment conditions of 24 hours at 40° C., following which the SBR test pieces were removed therefrom and the liquid was wiped from the surface thereof, following which the thicknesses of the test pieces were measured and the percent change thereof was calculated. Results are shown in TABLE 3-5.

TABLE 3-5

| | Working Examples | |
|---|---|---|
| Component | 19<br>1233Z/7100 | 20<br>1233Z/AE3000 |
| Mass % ratio | 99/1 | 99/1 |
| Before immersion (mm) | 2.05 | 2.05 |
| After immersion (mm) | 2.16 | 2.15 |
| Percent change (%) | 5.4 | 4.9 |

As a result of the foregoing testing, it was found that even where the amount of HFE-type nonflammable fluorinated-type solvent that was blended with (Z)-1-chloro-3,3,3-trifluoropropene was reduced and the mass % ((Z)-1-chloro-3,3,3-trifluoropropene/HFE-type nonflammable fluorinated-type solvent) was made to be 99/1, it was still possible to adequately reduce the problem of the erosivity of (Z)-1-chloro-3,3,3-trifluoropropene with respect to SBR, and to cause the percent swelling to be held to under 6%, which is such as to allow products employing SBR to be maintained at a level of roughly constant quality (TABLE 3-5).

Exemplary Test 4: Evaluation of Invasiveness (Short-Term)

Materials and Methods

In similar fashion as at Exemplary Test 1, solutions in accordance with the aforementioned Working Examples 1 through 18 and Comparative Examples 1 through 8 were respectively prepared. Furthermore, the test pieces indicated below were prepared for the purpose of evaluating short-term invasiveness.

Resin: ABS (acrylonitrile-butadiene-styrene)

PC (polycarbonate)

(All of the above were obtained from Nippon Testpanel Co., Ltd.)

The surfaces of the foregoing resin test pieces (10 mm×10 mm×2 mm in size were wiped with microfiber cloths that had been dampened with solutions according to Working Examples 1 through 18 and Comparative Examples 1 through 8. The change in the external appearance at the surfaces of the respective test pieces was thereafter determined by visual inspection and touch. Absence of change in external appearance was evaluated as GOOD, existence of a change therein was evaluated as BAD, and a notation was made as to the condition of the surface of the resin.

Test Results

Results of tests carried out as described above are shown at TABLE 4-1 through TABLE 4-4.

TABLE 4-1

| | | | Working Examples | | | | | |
|---|---|---|---|---|---|---|---|---|
| | | | 1 | 2 | 3 | 4 | 5 | 6 |
| | Component | | 1233Z/AE3000 | | | | | |
| | Mass % ratio | Standard | 30/70 | 50/50 | 70/30 | 80/20 | 85/15 | 90/10 |
| Resin | ABS | GOOD<br>No change | GOOD<br>No change | GOOD<br>No change | GOOD<br>No change | GOOD<br>No change | BAD<br>Tacky | BAD<br>Tacky |
| | PC | GOOD<br>No change | GOOD<br>No change | GOOD<br>No change | GOOD<br>No change | GOOD<br>No change | GOOD<br>No change | BAD<br>Whitening |

TABLE 4-2

| | | | Working Examples | | | | | |
|---|---|---|---|---|---|---|---|---|
| | | | 7 | 8 | 9 | 10 | 11 | 12 |
| | Component | | 1233Z/7000 | | | | | |
| | Mass % ratio | Standard | 30/70 | 50/50 | 70/30 | 80/20 | 90/10 | 95/5 |
| Resin | ABS | GOOD No change | GOOD No change | GOOD No change | GOOD No change | GOOD No change | GOOD No change | BAD Tacky |
| | PC | GOOD No change | GOOD No change | GOOD No change | GOOD No change | GOOD No change | GOOD No change | BAD Whitening |

TABLE 4-3

| | | | Working Examples | | | | | |
|---|---|---|---|---|---|---|---|---|
| | | | 13 | 14 | 15 | 16 | 17 | 18 |
| | Component | | 1233Z/7100 | | | | | |
| | Mass % ratio | Standard | 30/70 | 50/50 | 70/30 | 80/20 | 85/15 | 90/10 |
| Resin | ABS | GOOD No change | GOOD No change | GOOD No change | GOOD No change | GOOD No change | GOOD No change | BAD Tacky |
| | PC | GOOD No change | GOOD No change | GOOD No change | GOOD No change | GOOD No change | GOOD No change | BAD Whitening |

TABLE 4-4

| | | | Comparative Examples | | | | | | | |
|---|---|---|---|---|---|---|---|---|---|---|
| | Component | Standard | 1 Quick-drying stock solution | 2 De-greasing cleaner | 3 Air-dry stock solution | 4 Trichloro-ethane | 5 1233Z alone | 6 AE3000 alone | 7 7000 alone | 8 7100 alone |
| Resin | ABS | GOOD No change | GOOD No change | GOOD No change | GOOD No change | GOOD No change | BAD Tacky | GOOD No change | GOOD No change | GOOD No change |
| | PC | GOOD No change | GOOD No change | GOOD No change | GOOD No change | GOOD No change | BAD Whitening | GOOD No change | GOOD No change | GOOD No change |

In the case of (Z)-1-chloro-3,3,3-trifluoropropene, which is one of the principal components employed in the detergent composition in accordance with the means of the present invention, even the brief contact that occurred as a result of wiping the surface with a microfiber cloth that had been dampened with solution caused deterioration of resins comprising ABS or PC (TABLE 4-4).

However, it was found that when HFE-type nonflammable fluorinated-type solvent was blended with (Z)-1-chloro-3,3,3-trifluoropropene to obtain a detergent composition in accordance with the means of the present invention, such deterioration of resin as a result of brief contact no longer occurred (TABLE 4-1 through TABLE 4-3).

Exemplary Test 5: Evaluation of Invasiveness (Investigation Using Brake Hoses for Actual Vehicles)

Materials and Methods

Rear brake hose sets for an automobile (Model No. MH23S) sold by Suzuki Motor Corporation and an automobile (Model No. GE6) sold by Honda Motor Co., Ltd., were obtained, and the brake hoses were used as test samples. Prior to testing, thicknesses of the brake hoses were measured.

The foregoing brake hoses were placed in jars, and solutions according to Working Example 3, Comparative Example 1, Comparative Example 2, and Comparative Example 3 were further placed therein in such fashion as to cause the brake hoses to be immersed therein. The jars were thereafter placed in a Temperature & Humidity Chamber (HPAV-120-40; Isuzu Seisakusho Co., Ltd.; Japan) set to 40° C., and allowed to stand for 72 hours.

After 72 hours, the brake hoses were removed from the jars, a cloth was used to wipe the solution off therefrom, and the condition of the surfaces thereof was inspected, following which weights and thicknesses of the brake hoses were measured, and the percent swelling (%) was calculated.

Test Results

Percent swelling after 72 hours for automotive (Model No. MH23 S) brake hose at Working Example 3, Comparative Example 1, Comparative Example 2, and Comparative Example 3 was respectively −4.8%, −4.0%, −3.7%, and −3.5%. Furthermore, percent swelling after 72 hours for automotive (Model No. GE6) brake hose at Working Example 3, Comparative Example 1, Comparative Example 2, and Comparative Example 3 was respectively −3.1%, −2.3%, −4.0%, and −1.8%. No cracking, tearing, or other such abnormal appearance due to degradation of rubber was observed.

As detergent compositions in accordance with the means of the present invention possess superior drying characteristics as confirmed at Exemplary Test 2, even where the detergent composition adheres thereto, it will not remain in this state for a long period of time but will evaporate. But even in the unlikely event that, while washing a brake hose, the detergent composition should remain there in that state causing it to be immersed for a long period of time in similar fashion as was the case at the foregoing Exemplary Test 5, the percent swelling due to the detergent composition will be low, and there will be no occurrence of cracking, tearing, or other such abnormal appearance due to degradation of rubber.

Moreover, while various types of resins are, besides rubber, employed at front wheel brakes, rear wheel brakes, calipers, cylinders, and other such brake devices, because, as was confirmed at Exemplary Test 3, detergent compositions in accordance with the means of the present invention exhibit a low degree of invasiveness with respect to such resins, the danger of causing occurrence of an abnormality as a result of washing is lower than would be the case with a conventional detergent.

It can therefore be understood that detergent compositions in accordance with the means of the present invention thus possess properties more suitable for washing of brake equipment and regions peripheral thereto than conventional detergents.

Exemplary Test 6: Evaluation of Drying Characteristics (Aerosol Composition)

Materials and Methods

In similar fashion as at Exemplary Test 1, solutions in accordance with the aforementioned Working Example 3 and Working Example 15 were prepared. Using LPG (liquefied petroleum gas) as gas propellant for the aerosol composition, solutions in accordance with Working Example 3 and Working Example 15 were mixed with LPG to obtain aerosol compositions with which pressure-resistant cans were respectively filled.

A Temperature & Humidity Chamber (HPAV-120-40; Isuzu Seisakusho Co., Ltd.; Japan) was set so as to cause conditions therein to be such that humidity was 70% and temperature was 45° C., 25° C., or 10° C., SPCC-SB Standard Test Plates (1 -phi5; 0.8×70×150 mm) (Nippon Testpanel Co., Ltd.; Japan) were placed so as to stand upright in vertical fashion over a saucer within the Temperature & Humidity Chamber, and allowed to stand. When the temperatures of the Standard Test Plates had stabilized, aerosol compositions were sprayed for 10 seconds from the pressure-resistant cans filled with solutions in accordance with Working Example 3 and Working Example 15 onto the Standard Test Plates from locations separated approximately 20 cm therefrom, and visual inspection was employed to measure the time until the dripping liquid had dried.

Test Results

Results of tests carried out as described above are shown at TABLE 5-1.

TABLE 5-1

| | Component<br>Mass % ratio | Working Example 3<br>1233Z/AE3000<br>70/30 | Working Example 15<br>1233Z/7100<br>70/30 |
|---|---|---|---|
| High-temperature ambient conditions (40° C., 70%) | Drying time (min sec) | 0' 12" | 0' 08" |
| Normal-temperature ambient conditions (25° C., 70%) | Drying time (min sec) | 0' 20" | 0' 15" |
| Low-temperature ambient conditions (10° C., 70%) | Drying time (min sec) | 0' 30" | 0' 28" |

It was confirmed that detergent compositions in accordance with the means of the present invention are such that even where these are made into aerosol compositions and are sprayed, as drying will occur within several tens of seconds, satisfactory drying characteristics are exhibited thereby (TABLE 5-1).

Moreover, LPG or compressed air was then used to cause the composition for washing of Working Example 15, the quick-drying stock solution of Comparative Example 1, the degreasing cleaner of Comparative Example 2, and the air-dry stock solution of Comparative Example 3 to be made into aerosol compositions that were sprayed in aerosol form onto Standard Test Plates that were at a variety of temperature conditions, i.e., 40° C., 30° C., 20° C., and 5° C., measurement was carried out of the temperature at the surface where applied, the temperature following drying, and the difference in temperature therebetween, as well as the time required for drying, and investigation was carried out to compare the properties thereof. Results of testing are shown in TABLE 5-2 and TABLE 5-3.

TABLE 5-2

| | | Aerosol (Detergent + LPG) | | | |
|---|---|---|---|---|---|
| | | Comparative Examples | | | Working Example |
| | Component<br>Mass % ratio | 1<br>Quick-drying stock solution | 2<br>Degreasing cleaner | 3<br>Air-dry stock solution | 15<br>1233Z/7100<br>70/30 |
| Temperature within warehouse 40° C. | Temperature at surface where applied (° C.) | 40.7 | 40.6 | 40.3 | 39.3 |
| | Temperature following drying (° C.) | 26.6 | 31.1 | 38.3 | 24.7 |
| | Temperature difference | Δ 14.1 | Δ 9.5 | Δ 2.0 | Δ 14.6 |
| | Drying time (sec) | 19" | 35" | 123" | 15" |
| Temperature within warehouse 30° C. | Temperature at surface where applied (° C.) | 32.7 | 31.5 | 31.4 | 31.2 |
| | Temperature following drying (° C.) | 23.4 | 21.7 | 29.7 | 18.2 |
| | Temperature difference | Δ 9.3 | Δ 9.8 | Δ 1.7 | Δ 13.0 |
| | Drying time (sec) | 28" | 38" | 140" | 18" |
| Temperature within warehouse 20° C. | Temperature at surface where applied (° C.) | 20.6 | 20.6 | 20.8 | 20.7 |
| | Temperature following drying (° C.) | 13.4 | 13.1 | 19.6 | 11.0 |
| | Temperature difference | Δ 7.2 | Δ 7.5 | Δ 1.2 | Δ 9.7 |
| | Drying time (sec) | 31" | 55" | 198" | 24" |

TABLE 5-2-continued

| | | Aerosol (Detergent + LPG) | | | |
|---|---|---|---|---|---|
| | | Comparative Examples | | | Working Example |
| | Component Mass % ratio | 1 Quick-drying stock solution | 2 Degreasing cleaner | 3 Air-dry stock solution | 15 1233Z/7100 70/30 |
| Temperature within warehouse 5° C. | Temperature at surface where applied (° C.) | 7.1 | 6.0 | 6.8 | 7.0 |
| | Temperature following drying (° C.) | 2.7 | 0.3 | 4.4 | 1.4 |
| | Temperature difference | Δ 4.4 | Δ 5.7 | Δ 2.4 | Δ 5.6 |
| | Drying time (sec) | 36" | 77" | 225" | 25" |

TABLE 5-3

| | | Aerosol (Detergent + Compressed Air) | |
|---|---|---|---|
| | Component Mass % ratio | Comparative Example 1 Quick-drying stock solution | Working Example 15 1233Z/7100 70/30 |
| Temperature within warehouse 40° C. | Temperature at surface where applied (° C.) | 41.0 | 39.5 |
| | Temperature following drying (° C.) | 33.6 | 33.6 |
| | Temperature difference | Δ 7.4 | Δ 5.9 |
| | Drying time (sec) | 4" | 4" |
| Temperature within warehouse 30° C. | Temperature at surface where applied (° C.) | 31.0 | 31.1 |
| | Temperature following drying (° C.) | 29.7 | 29.9 |
| | Temperature difference | Δ 1.3 | Δ 1.2 |
| | Drying time (sec) | 10" | 6" |
| Temperature within warehouse 20° C. | Temperature at surface where applied (° C.) | 20.6 | 20.5 |
| | Temperature following drying (° C.) | 18.5 | 18.8 |
| | Temperature difference | Δ 2.1 | Δ 1.7 |
| | Drying time (sec) | 11" | 8" |
| Temperature within warehouse 5° C. | Temperature at surface where applied (° C.) | 7.4 | 6 .7 |
| | Temperature following drying (° C.) | 5.9 | 5.5 |
| | Temperature difference | Δ 1.5 | Δ 1.2 |
| | Drying time (sec) | 15" | 12" |

As a result of the foregoing testing, it was found that causing the detergent composition of Working Example 15 to be made into an aerosol composition together with LPG and spraying this onto the Standard Test Plates resulted in properties that were such that drying occurred roughly as quickly as when conventional quick-drying stock solution was used (TABLE 5-2). Furthermore, whereas it might ordinarily be assumed that drying speed of the aerosol composition sprayed thereon would simply become shorter as temperature of the Standard Test Plates was increased to 30° C. or 40° C., where the detergent composition of Working Example 15 was made into an aerosol composition together with LPG, as there was a large decrease in temperature following drying after spraying of this onto the Standard Test Plate, causing there to be a large difference in temperature before versus after spraying, this caused the time until drying had occurred to become extremely short at high temperature, making it possible to avoid worsening of ease of operations (TABLE 5-2). It can be understood that substances in accordance with the means of the present invention displayed satisfactory ease of operations over a wide range of temperatures, suitable drying times being maintained even at high temperatures.

Furthermore, it was confirmed that even where compressed air was used to aerosolize and spray the detergent, the drying characteristics possessed thereby were on the same order as those obtained when compressed air was used to aerosolize and spray a conventional quick-drying stock solution (TABLE 5-3). It can be understood that even when compressed air was used to aerosolize substances in accordance with the means of the present invention, it was found over a wide range of temperatures that these displayed an ease of operations which was on the same order as that displayed by products employing conventional quick-drying stock solution.

Exemplary Test 7: Evaluation of Aerosol Washability

Materials and Methods

In similar fashion as at Exemplary Test 6, detergent compositions according to Working Example 3, Working Example 15, Comparative Example 1, Comparative Example 3, and Comparative Example 4 were used to respectively prepare aerosol compositions. Test plates were made to stand upright, and 1 g of silicone grease was spread out on each thereof over a region that was 35 mm×50 mm in size. Each aerosol composition was sprayed onto a portion of the region that was contaminated by grease that had been applied thereto and spread thereabout, washing being carried out only by means of the pressure of the aerosol.

Contact angle was measured at blank locations to which silicone grease did not adhere, locations at which silicone grease did adhere, locations at which washing of silicone grease was carried out only by means of the pressure of the aerosol, and locations at which silicone grease was washed off therefrom together with the aerosol composition. Where grease remained, the hydrophobic character of the grease caused increase in contact angle.

Test Results

Where a detergent composition according to Working Example 3 or Working Example 15 was used to prepare an aerosol composition that was sprayed thereonto, the miscibility with respect to lipids possessed by the detergent composition according to Working Example 3 or Working Example 15 and the pressure of the sprayed aerosol alone were enough to cause the silicone grease to be almost completely removed therefrom. Sprayed locations and locations where dripping of liquid occurred achieved a dried state within several tens of seconds. It can be understood that causing a nonflammable detergent composition containing (Z)-1-chloro-3,3,3-trifluoropropene and HFE-type nonflammable fluorinated-type solvent in accordance with the means of the present invention to be provided in the form of an aerosol composition will make it possible to cause adhering lipids to be washed therefrom extremely quickly and safely.

Exemplary Test 8: Evaluation of Gas Used in Aerosol Composition

Materials and Methods

In similar fashion as at Exemplary Test 1, a solution in accordance with the aforementioned Working Example 15 was prepared. Besides LPG (liquefied petroleum gas), 1234ZE ((E)-1,3,3,3-tetrafluoroprop-1-ene/trans-1,3,3,3-tetrafluoropropene, HFO-1234Zze-(E)) and CO2 at 0.2 MPa or higher were used as gas propellant for the aerosol composition, being mixed with the foregoing solution to obtain aerosol compositions with which pressure-resistant cans were respectively filled. 1234ZE is recommended by the United Nations and is classified as a "nonflammable gas" in accordance with flammability categorization systems employed not only by Japan but also by the United States, Europe, and various countries throughout Asia. Note that due to differences in the measurement methods employed, it is classified as a flammable gas under the High Pressure Gas Safety Law of Japan.

Investigation was carried out to determine whether any differences in sprayed state, drying time, sprayable distance, or washability were respectively observed as a function of the type of gas employed in the aerosol composition. Note that because it was observed with test plates made of metal that depending on the aerosol composition in question there was a tendency for the temperature of the surface of the plate to drop due to the heat of volatilization, resin material, which was less affected by the tendency to suffer a drop in temperature, was employed as test plate material so as to eliminate the effect which differences in the type of gas employed had on drying time. Test plates made of polypropylene were made to stand upright in vertical fashion in a thermostatic chamber at 25° C. The aerosol compositions were sprayed for 10 seconds from pressure-resistant cans filled with the solution in accordance with Working Example 15 onto test plates from locations separated approximately 5 cm therefrom, visual inspection being employed to observe the sprayed state of the aerosols, the state of the liquid after it was sprayed onto the test plates, and to measure the time until the liquid had dried.

Moreover, to ascertain washability, silicone grease was applied to the test plates, spraying was carried out while varying the spray distances of the respective aerosols, the diameter of the region wetted by solution at the time that the aerosol arrived at the test plate was measured, and evaluation was carried out such it was deemed to be EXCELLENT if the solution of the aerosol did not dry but flowed downward and dissolved the silicone grease and caused it to be adequately washed away therefrom so that there was no residue remaining from the silicone grease; GOOD if the solution of the aerosol did not dry but dripped downward therefrom and generally washed away the silicone grease; FAIR if the solution of the aerosol stayed where it was and while causing the silicone grease to be dissolved by the solution of the aerosol was such that the solution of the aerosol dried before it could complete its task so that residue from the silicone grease remained on the test plate; and BAD if evaporation of the solution of the aerosol from the test plate caused the silicone grease to remain as is without being adequately dissolved thereby.

Test Results

Results of tests carried out as described above are shown at TABLE 6-1.

TABLE 6-1

| Type of gas | | LPG | | 1234ZE | | $CO_2$ (internal pressure 0.2 MPa or higher) | |
|---|---|---|---|---|---|---|---|
| Risk | | Combustion | | Combustion | | Global warming | |
| Sprayed state | | Mist-like | | Mist-like | | Mist-like | |
| Drying time (25° C.; spray for 10 sec from distance of 5 cm) | | 20 sec | | 10 sec | | 90 sec | |
| Sprayable distance (25° C.) | Washability | 5 cm | GOOD | 5 cm | GOOD | Up to 2 m | GOOD |
| | | 10 cm | GOOD | 10 cm | FAIR | | |
| | | 20 cm | FAIR | 20 cm | BAD | | |
| | | 30 cm | FAIR | 30 cm | BAD | | |
| | | 40 cm | BAD | 40 cm | BAD | | |

As a result, it was found that using LPG, 1234ZE, and $CO_2$ at 0.2 MPa or higher as gas propellant caused the payload in the form of the solution of Working Example 15 to be well-dissolved therewith, and that gasification was instantaneous, the sprayed state being mist-like. Furthermore, when this was sprayed for 10 seconds from a distance of 5 cm at 25° C., the solution which adhered to the test plate in mist-like fashion dried in 20 seconds in the case of LPG, and in 10 seconds in the case of 1234ZE. On the other hand, with $CO_2$ at 0.2 MPa or higher, the sprayed state was mist-like, but because the amount of gas used was less than was the case with LPG or 1234ZE, and because it was in a state in which there was reduced volatilization of liquid, this caused the time until dry to increase to 90 seconds.

Moreover, when washability was then evaluated, it was found when LPG was employed as gas propellant that a region up to 8 cm in diameter could be wetted by the solution of the aerosol at spraying distances up to 10 cm and that the silicone grease at that location was generally washed away thereby; but that when spraying distance was increased to 20 cm, although a region up to 8 cm in diameter could still be wetted by the solution of the aerosol, the solution of the aerosol dried before it could complete its task so that residue from the silicone grease remained on the test plate; and that when spraying distance was further increased to 40 cm or more, although a region up to 8 cm in diameter could still be wetted by the solution of the aerosol, evaporation of the solution of the aerosol from the test plate caused the silicone grease to remain as is without being adequately dissolved thereby. Furthermore, because LPG is a flammable gas, precautions must be taken when using it in large quantities notwithstanding the fact that the payload may be nonflammable. Based on the foregoing, it can be understood when LPG is employed as gas propellant that use of a short spraying distance will make it possible, by virtue of the pressure and amount of liquid, to wash away contaminants therefrom after wetting these to a degree such as will not cause scattering of dust and so forth, and that causing the solution of the aerosol to be applied to a cloth will make it possible to wipe it up and reduce loss thereof without occurrence of dripping of liquid.

Furthermore, when 1234ZE was employed as gas propellant, it was found that the time until dry was shorter than was the case with LPG, it being the case that a region up to 8 cm in diameter could be wetted by the solution of the aerosol at spraying distances up to 5 cm and that the silicone grease at that location was generally washed away thereby; but that when spraying distance was increased to 10 cm, although a region up to 8 cm in diameter could still be wetted by the solution of the aerosol, the solution of the aerosol dried before it could complete its task and residue from the silicone grease remained on the test plate; and that when spraying distance was further increased to 20 cm or more, the silicone grease remained as is, vaporization from the test plate of both the solution of 1234ZE and the payload which was the solution of Working Example 15 preventing these from achieving a state in which they were able to wet it and wash it off therefrom.

It so happens that, unlike the foregoing LPG or 1234ZE, when nonflammable $CO_2$ at 0.2 MPa or higher was employed as gas propellant, it was found that a small region that was 5 cm in diameter could be wetted in focused fashion by the solution of the aerosol at spraying distances up to as far away as 2 m, and that in accompaniment to the fact that the time until dry was dramatically longer than was the case with either LPG or 1234ZE, the solution of the aerosol was able to dissolve the silicone grease and was able to generally wash away the silicone grease therefrom. It was as a result possible to confirm the superiority of $CO_2$ at 0.2 MPa or higher as a gas propellant for use in accordance with the means of the present invention. On the other hand, while the amount of gas used was less than with LPG or 1234ZE, because it has a potential effect on global warming, there is a need for precautions to be taken with respect to $CO_2$. Furthermore, because the gas propellant assumes a mist-like state, in situations such as those in which silicone grease or other such dirt has hardened into a thickened layer, it may become necessary to increase the amount used so as to make it possible for the aerosol to adequately wash this off therefrom.

Exemplary Test 9: Evaluation of Gas Used in Aerosol Composition

Investigation was therefore carried out in which the internal pressure of $CO_2$ was increased in an attempt to increase the washability thereof. Moreover, investigation was also carried out with respect to use of N2, which does not have an effect on global warming when used as gas propellant.

Materials and Methods

In similar fashion as was carried out at Exemplary Test 1, a solution in accordance with the aforementioned Working Example 15 was prepared. Using $CO_2$ at 0.2 MPa or higher, $CO_2$ at 0.2 MPa or lower, and $N_2$ at 0.2 MPa or higher as gas propellants for the aerosol composition, these were mixed with the foregoing solution to obtain aerosol compositions with which pressure-resistant cans were respectively filled.

Investigation was carried out to determine whether any differences in sprayed state, drying time, sprayable distance, or washability were respectively observed as a function of the type of gas employed in the aerosol composition. During this testing as well, resin material, which was less affected by the tendency to suffer a drop in temperature, was employed as test plate material so as to eliminate the effect which differences in the type of gas employed had on drying time. Test plates made of polypropylene were made to stand upright in vertical fashion in a thermostatic chamber at 25° C. The aerosol compositions were sprayed for 10 seconds from pressure-resistant cans filled with the solution in accordance with Working Example 15 onto test plates from locations separated approximately 5 cm therefrom, visual inspection being employed to observe the sprayed state of the aerosols, the state of the liquid after it was sprayed onto the test plates, and to measure the time until the liquid had dried.

Moreover, to ascertain washability, silicone grease was applied to the test plates, spraying was carried out while varying the spray distances of the respective aerosols, the diameter of the region wetted by solution at the time that the aerosol arrived at the test plate was measured, and evaluation was carried out such it was deemed to be EXCELLENT if the solution of the aerosol did not dry but flowed downward and dissolved the silicone grease and caused it to be adequately washed away therefrom so that there was no residue remaining from the silicone grease; GOOD if the solution of the aerosol did not dry but dripped downward therefrom and generally washed away the silicone grease; FAIR if the solution of the aerosol stayed where it was and while causing the silicone grease to be dissolved by the solution of the aerosol was such that the solution of the aerosol dried before it could complete its task so that residue from the silicone grease remained on the test plate; and BAD if evaporation of the solution of the aerosol from the test plate caused the silicone grease to remain as is without being adequately dissolved thereby.

Test Results

Results of tests carried out as described above are shown at TABLE 6-2.

TABLE 6-2

| Type of gas | | $CO_2$ (internal pressure 0.2 MPa or higher) | | $CO_2$ (internal pressure 0.2 MPa or lower) | | $N_2$ | |
|---|---|---|---|---|---|---|---|
| Risk | | Global warming | | Global warming | | None | |
| Sprayed state | | Mist-like | | Rod-like | | Rod-like | |
| Drying time (25° C.; spray for 10 sec from distance of 5 cm) | | 90 sec | | 90 sec | | 90 sec | |
| Sprayable distance (25° C.) | Washability | Up to 2 m | GOOD | Up to 1 m | EXCELLENT | Up to 10 m | EXCELLENT |

When $CO_2$ at 0.2 MPa or higher was employed as gas propellant, the sprayed state was mist-like. However, when $CO_2$ at 0.2 MPa or lower was employed as gas propellant, and when $N_2$ at 0.2 MPa or higher was used as gas propellant, it was found that gasification of the gas propellant was not instantaneous but that the sprayed state produced by the aerosol was rod-like in shape. Due to the fact that it was rod-like in shape, it can be expected that the solution with its high washability will adequately dissolve oily components and other such dirt, increasing washability. Moreover, upon therefore investigating the time required for the liquid that was sprayed to dry when this was sprayed for 10 seconds from a distance of 5 cm at 25° C., it was determined that 90 seconds was required for all situations tested, this being sufficient time to dissolve oily components and other such dirt, and this being capable of causing the solution to remain in the form of solution as residue on the test plate.

Upon then evaluating washability, it was found that when $CO_2$ at 0.2 MPa or higher was used as gas propellant, the sprayed state was mist-like for spraying distances up to 2 m, and that this was such as to permit the oily component that had been applied to the test plate to be generally washed away therefrom as a result of spraying for 10 seconds.

On the other hand, when $CO_2$ at 0.2 MPa or lower was used as gas propellant, it was found that although spraying distance decreased to 1 m, the sprayed state remained rod-like in shape, and it was possible while applying pressure to cause a small region that was 5 cm in diameter to be adequately wetted by the solution and washed in continuous fashion, as a result of which oily component that had been applied to the test plate was able to be completely washed off therefrom as a result of being sprayed for 10 seconds. It can be understood that, as the sprayed state of the aerosol was rod-like in shape, because this makes it possible to carry out washing in such fashion that contaminated locations are targeted in pinpoint fashion, this permits increase in the universality thereof.

In addition, when $N_2$ was used as gas propellant, it was found that gasification of the gas propellant was not instantaneous but that the sprayed state produced by the aerosol was rod-like in shape, that an increase to 0.2 MPa or higher made it possible to greatly increase spraying distance to up to 10 m, and moreover that it was possible while applying pressure to cause a small region that was 5 cm in diameter to be adequately wetted by the solution and washed in continuous fashion, as a result of which oily component that had been applied to the test plate was able to be completely washed off therefrom as a result of being sprayed for 10 seconds. It can be understood that when $N_2$ was used as gas propellant, as the sprayed state of the aerosol was rod-like in shape, and as the lack of miscibility of the gas made it possible by adjusting pressure to perform spraying from a distance as far as 10 m, because this makes it possible to carry out washing in such fashion that contaminated locations are targeted in pinpoint fashion, it is superior as a product in that it has increased universality. Furthermore, unlike $CO_2$, if $N_2$ is employed as the gas propellant for use in accordance with the means of the present invention, as there will be no concern with respect to global warming, and as this will make it possible to achieve a nonflammable product, from this standpoint as well, it was possible to confirm that it is even more superior.

INDUSTRIAL UTILITY

As a result of causing a detergent composition to contain (Z)-1-chloro-3,3,3-trifluoropropene and HFE-type nonflammable fluorinated-type solvent, it is possible to provide a novel detergent composition and an aerosol composition of same which, because they are nonflammable, possess little hazard of ignition or risk during fire, and which fall within the definition of nonhazardous materials under the Fire Prevention Law and do not require a hazardous material storage warehouse, and which are not subject to legal restrictions with respect to amounts that may be stored when the detergent composition is to be used in large quantities, and which moreover are of low toxicity, and which while having properties such that the environmental impact thereof in terms of depletion of the ozone layer and so forth is small, as well as washability and drying characteristics as good as or better than those of conventional detergent compositions which are used as brake cleaner, are imparted with superior properties in that they exhibit very little tendency to attack rubber and/or resin. Moreover, by using $N_2$ as gas propellant, it will be possible to provide an aerosol product which, while permitting achievement of a nonflammable product, also has high washing power such as will permit spraying that is rod-like in shape from a distance as far as 10 m.

The invention claimed is:

1. A method for washing car/vehicle/transportation means, the method comprising spraying onto car/vehicle/transportation means a detergent composition for washing automobiles, two-wheeled vehicles, bicycles, construction equipment, farm equipment, aircraft, railroad cars, ships, and/or various other types of car/vehicle/transportation means, thereby washing the car/vehicle/transportation means, wherein the detergent composition comprises (Z)-1-chloro-3,3,3-trifluoropropene and HFE-type nonflammable fluorinated-type solvent, mass % ratio thereof ((Z)-1-chloro-3,3,3-trifluoropropene/HFE-type nonflammable fluorinated-type solvent) being within a range that is 30/70 to 99/1.

2. A method for washing a braking device of car/vehicle/transportation means, the method comprising spraying onto a braking device of car/vehicle/transportation means a detergent composition for washing automobiles, two-wheeled vehicles, bicycles, construction equipment, farm equipment, aircraft, railroad cars, ships, and/or various other types of car/vehicle/transportation means, thereby washing the braking device of the car/vehicle/transportation means, wherein the detergent composition comprises (Z)-1-chloro-3,3,3-trifluoropropene and HFE-type nonflammable fluorinated-type solvent, mass % ratio thereof ((Z)-1-chloro-3,3,3-trifluoropropene/HFE-type nonflammable fluorinated-type solvent) being within a range that is 30/70 to 99/1.

* * * * *